(12) United States Patent
Kato et al.

(10) Patent No.: US 6,480,904 B1
(45) Date of Patent: Nov. 12, 2002

(54) DISK-TIME-SHARING APPARATUS AND METHOD

(75) Inventors: Tadaomi Kato, Kawasaki (JP); Osamu Kimura, Kawasaki (JP); Mikio Ito, Kawasaki (JP); Riichiro Take, Kawasaki (JP); Yuuji Hotta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/495,878

(22) Filed: Feb. 2, 2000

(30) Foreign Application Priority Data

Aug. 2, 1999 (JP) ............................................ 11-218757

(51) Int. Cl.[7] .............................................. G06F 12/00
(52) U.S. Cl. ............................ 710/6; 710/45; 709/102; 711/114; 711/151
(58) Field of Search ................................ 709/102–104; 710/5–7, 36–45; 711/111–114, 151, 122–134

(56) References Cited

U.S. PATENT DOCUMENTS

| | | | | |
|---|---|---|---|---|
| 5,640,597 A | * | 6/1997 | Noguchi et al. | ............... 710/21 |
| 5,652,857 A | * | 7/1997 | Shimoi et al. | ............... 711/113 |
| 5,734,861 A | * | 3/1998 | Cohn et al. | ............... 711/134 |
| 5,754,882 A |   | 5/1998 | Tobagi et al. | ............... 395/826 |
| 5,761,526 A | * | 6/1998 | Sakakura et al. | ............... 710/1 |
| 5,778,426 A | * | 7/1998 | DeKoning et al. | ............... 711/122 |
| 6,098,177 A | * | 8/2000 | Satoh | ............... 713/500 |

FOREIGN PATENT DOCUMENTS

| | | | |
|---|---|---|---|
| EP | 0723222 | 7/1996 | |
| EP | 1074908 | * 2/2001 | ............. G06F/3/06 |

* cited by examiner

*Primary Examiner*—Christopher B. Shin
(74) *Attorney, Agent, or Firm*—Staas & Halsey LLP

(57) ABSTRACT

A disk time-sharing apparatus is constructed by a disk apparatus having disk drives, an input/output request unit for issuing an input/output request to the disk apparatus, and an input/output scheduling unit. The input/output scheduling unit forms input/output groups obtained by grouping inputs/output sources to/from the disk apparatus, defines a ratio of time during which each input/output group uses the disk apparatus, and decides quanta (allocating time) $\tau1$ to $\tau3$ during which each input/output group can use the disk apparatus continuously on the basis of the defined time ratio. When input/output requests are received to the disk apparatus from a plurality of input/output groups, a time-sharing for using the disk apparatus by switching the allocating time $\tau1$ to $\tau3$ sequentially among the competing input/output groups is performed.

20 Claims, 19 Drawing Sheets

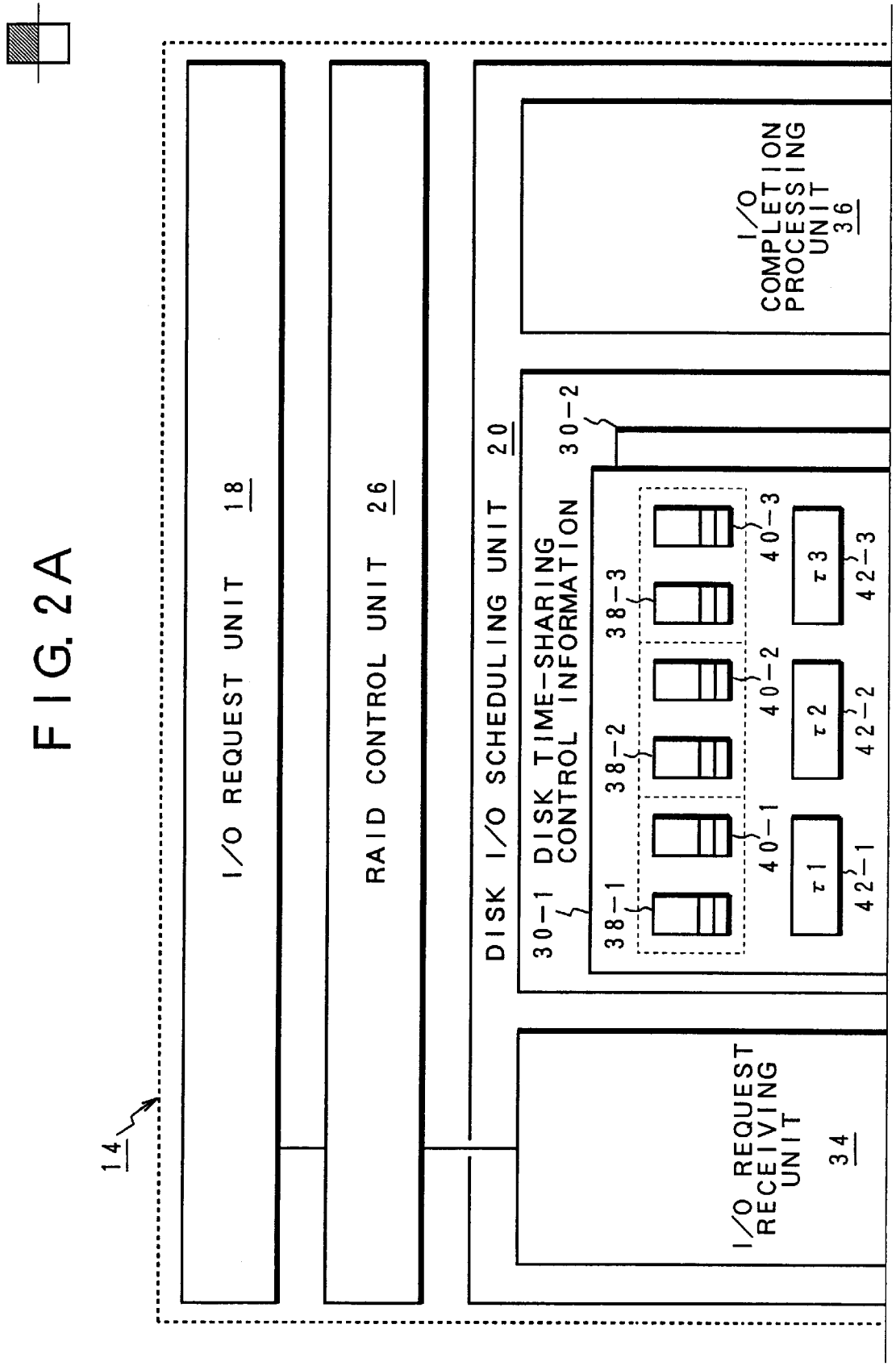

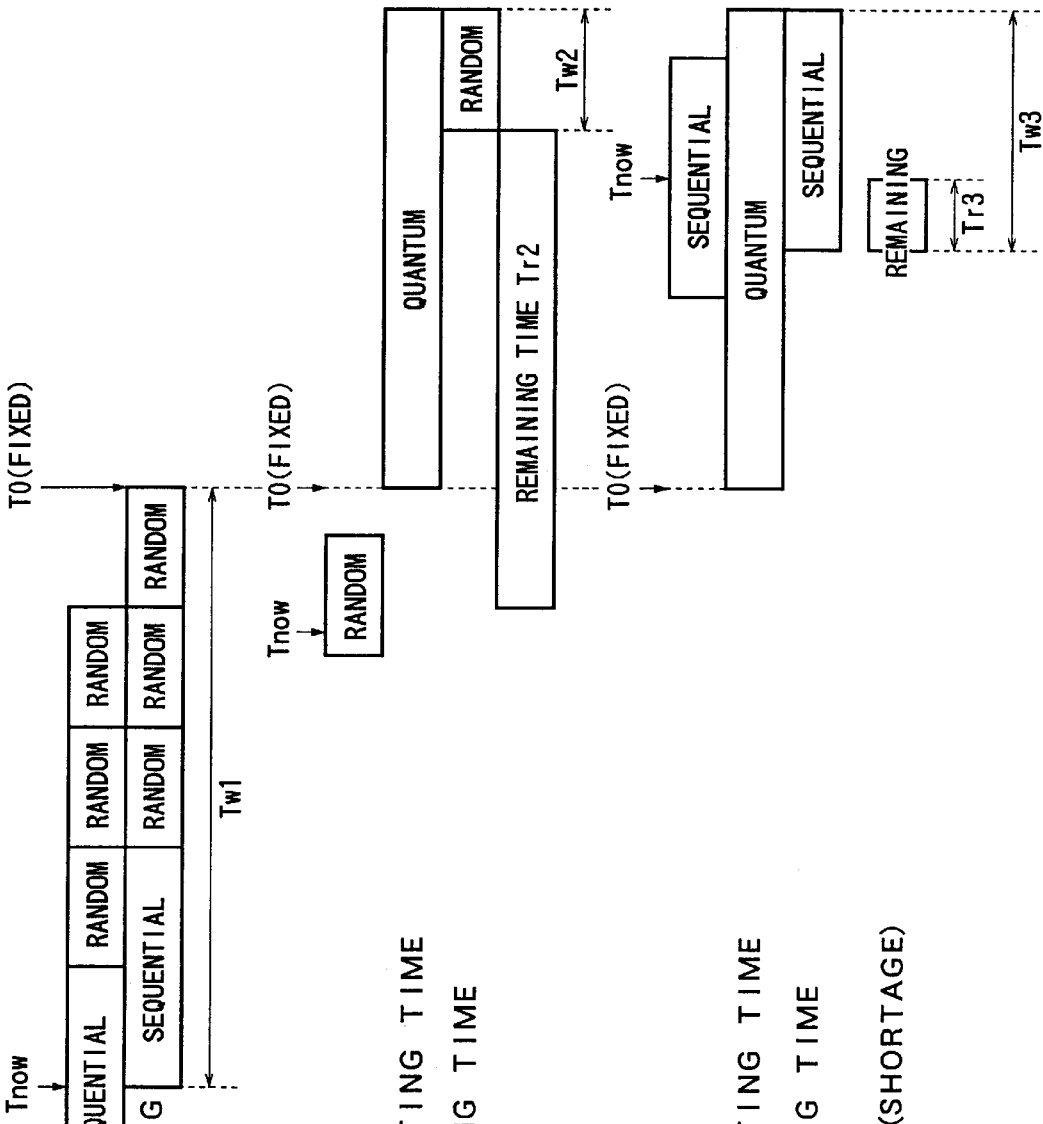

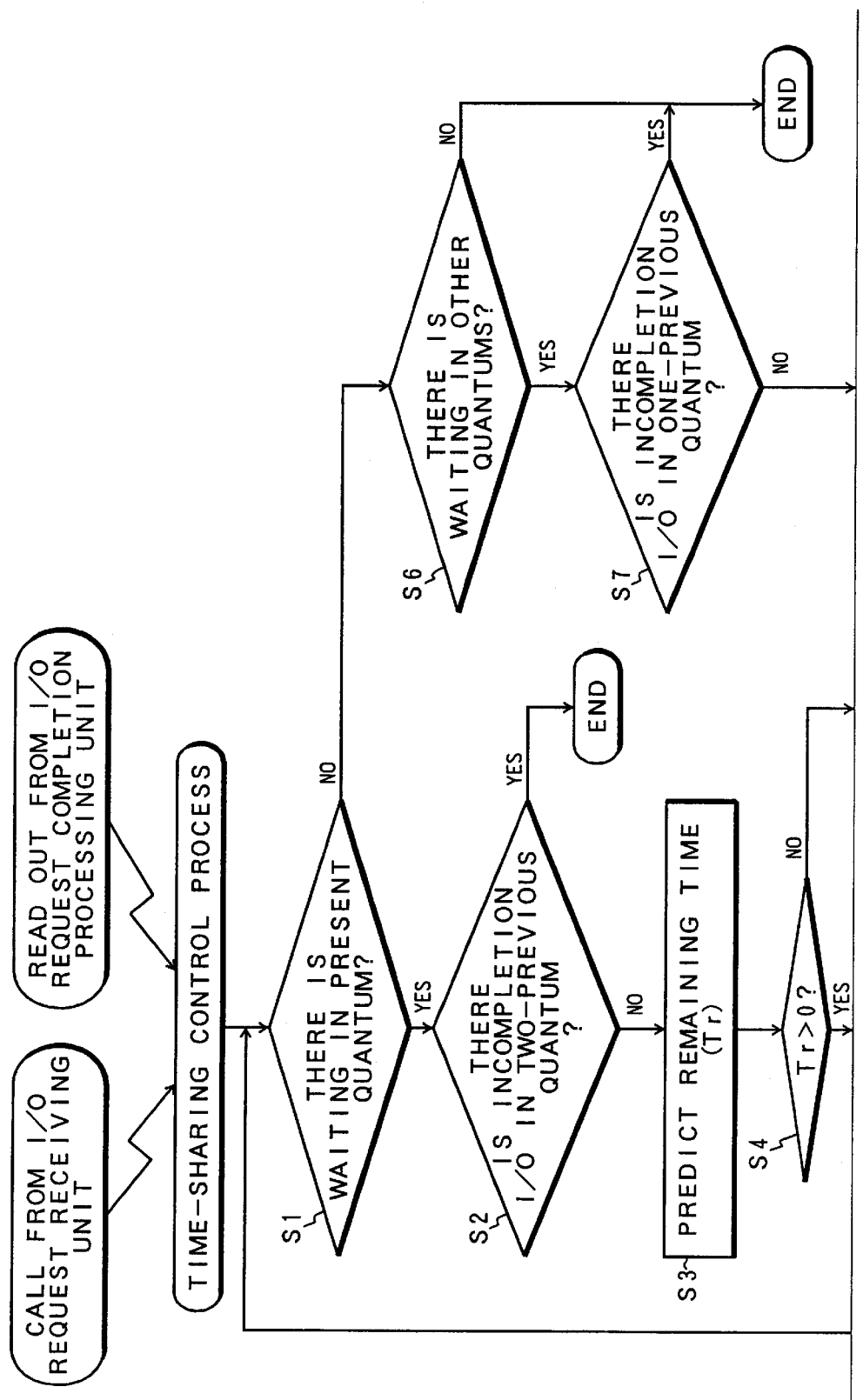

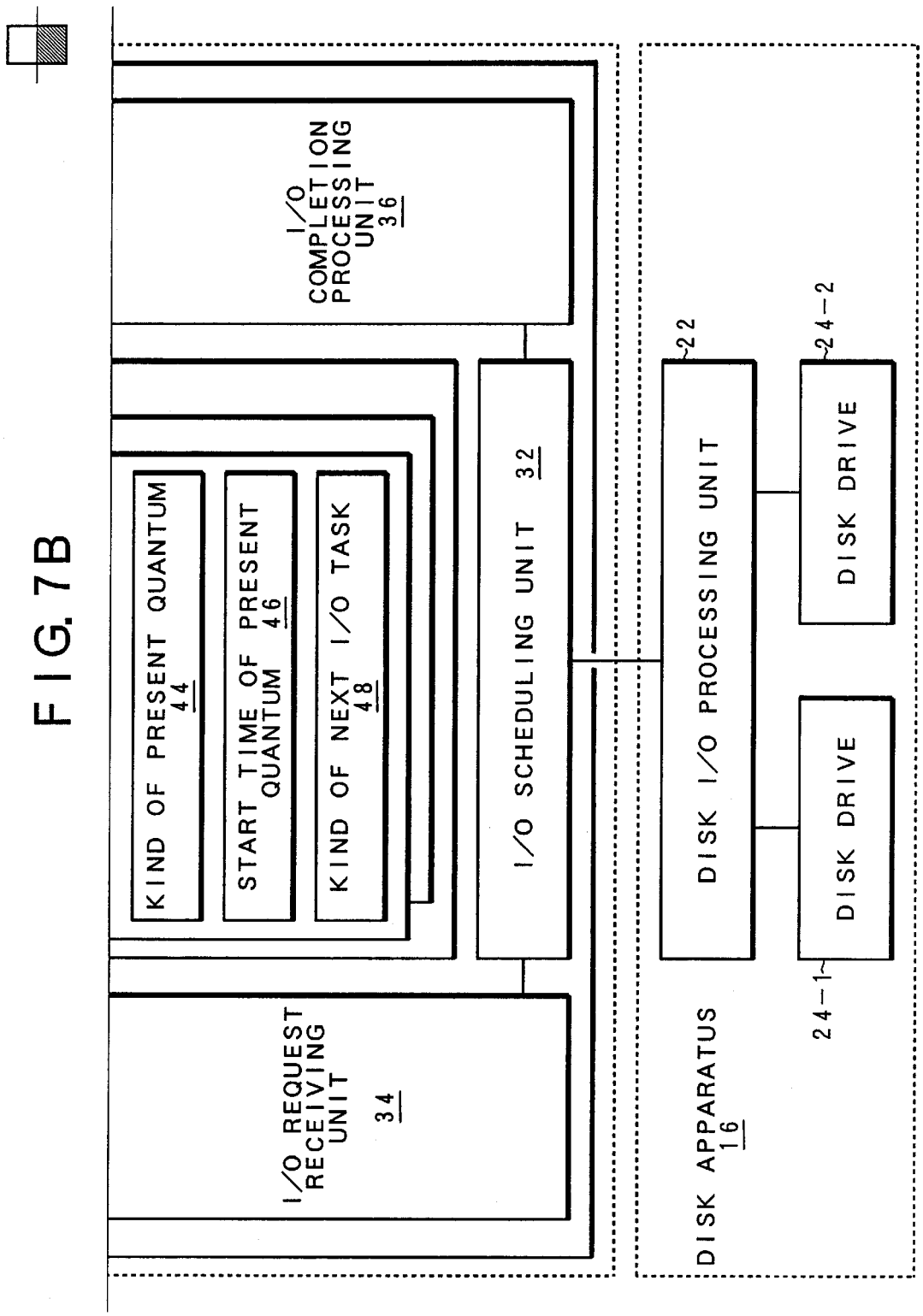

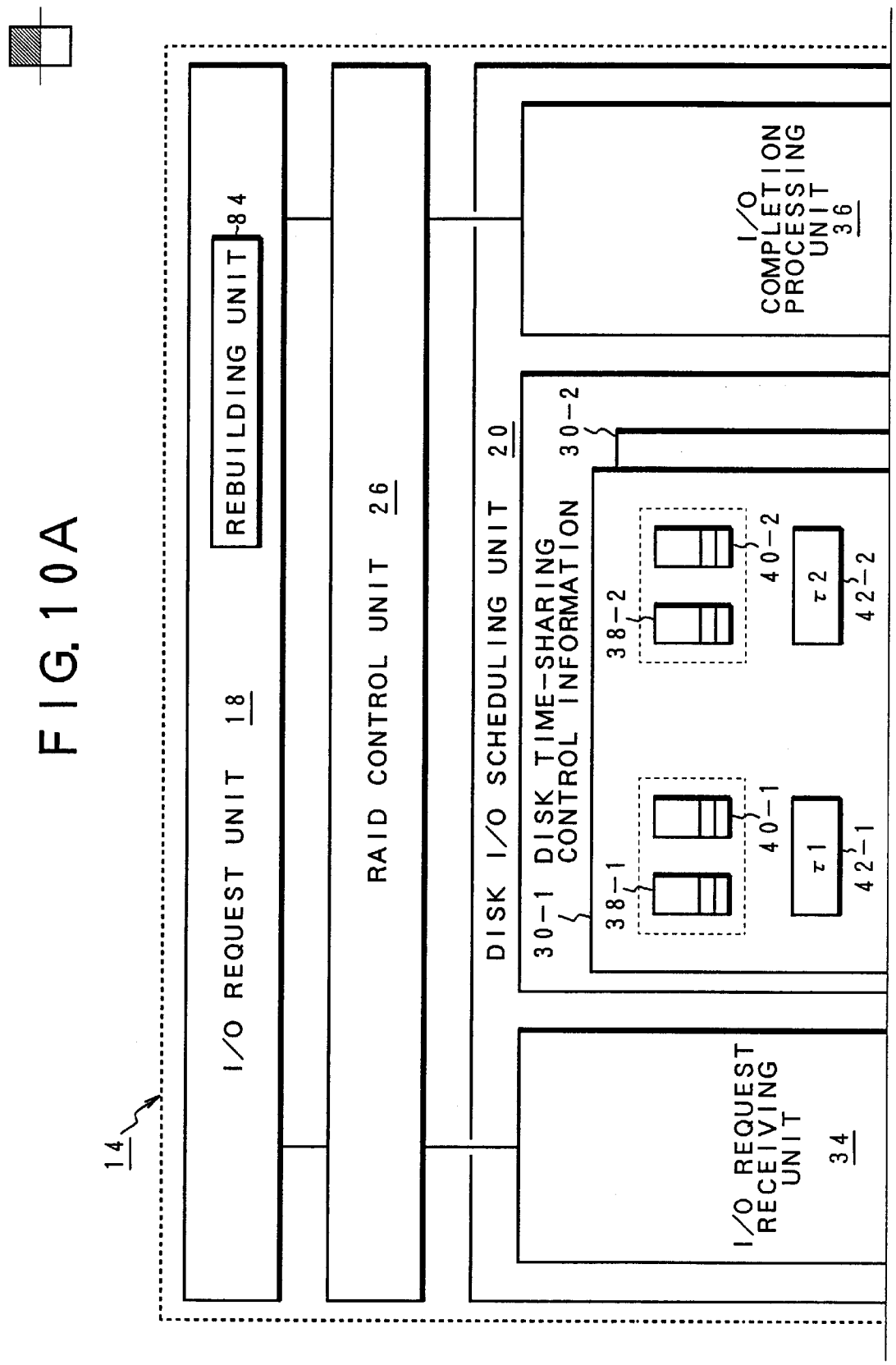

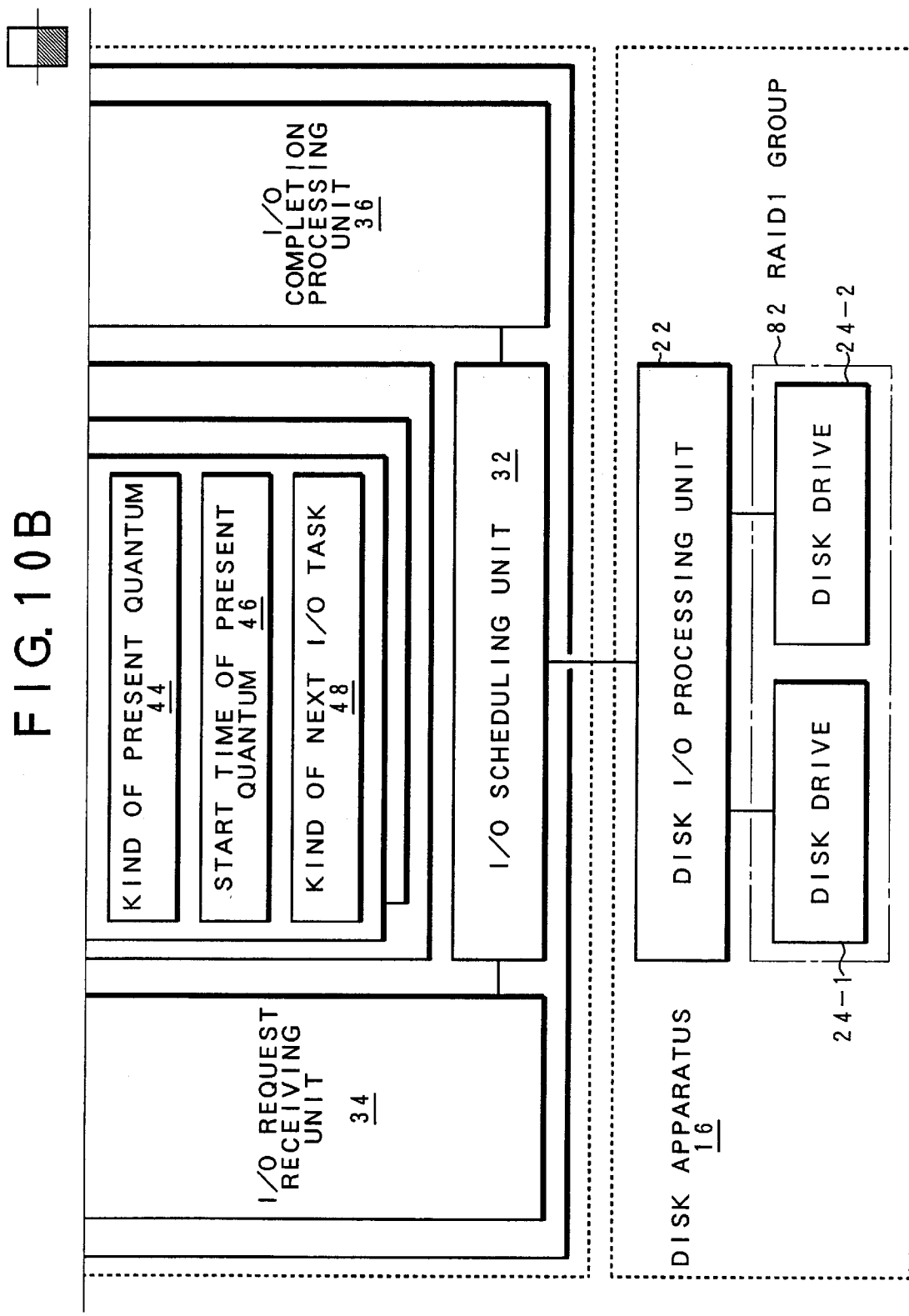

DISK-TIME-SHARING APPARATUS AND METHOD

BACKGROUND OF THE INVENTION

1. Field of the Invention

The present invention relates to disk time-sharing apparatus and method for scheduling the use of a disk apparatus on the basis of a plurality of inputs and outputs and, more particularly, to disk time-sharing apparatus and method for scheduling the use of a disk apparatus so as to sequentially switch allocating time for inputs and outputs which compete.

2. Description of the Related Arts

Hitherto, in a storage system for managing data by using a disk apparatus such as a hard disk drive or the like, for example, the disk apparatus is constructed so as to have an RAID structure, the RAID apparatus is connected subordinate to a disk control apparatus, thereby processing an input/output from an upper host, or the RAID apparatus is directly connected to a server, thereby processing an input/output from a server OS. In such a storage system, in the case where it is necessary that a random access in which a guarantee of a response time is required and a sequential access in which importance is attached to an amount of processes per unit time are performed for the same disk apparatus, the operation is performed in a time-sharing manner lest the random access and the sequential access compete. For example, an OLTP (On Line Transaction Processing) in which the random access is mainly performed is executed to a database of the disk apparatus in the daytime and a backup of the database is performed at night after the processing.

(Resource distribution of random access and sequential access)

In the storage system, however, in association with the realization of a non-stop processing, the OLTP processing of the random access system needs to be continued even at night, so that it is necessary to execute the backup as a sequential access during the OLTP processing of the random access system. In case of only the random access, an IOPS (Input Output Per Second) such as 100 IOPS as the number of inputting/outputting times per unit time which can satisfy a mean certain response time, for example, 30 milliseconds can be estimated. In case of only the sequential access, a throughput such as 20 MB/sec can be estimated. However, when the random access and the sequential access are simultaneously performed, since received input/output requests are processed by a queue using an FIFO, there is no mechanism to guarantee a period of time during which the random access can use the disk apparatus and a period of time during which the sequential access can use the disk apparatus. For instance, even when the random access of 50 IOPS at mean response time of 30 milliseconds and the sequential access of 5 MB/sec are desired, if the sequential access frequently occurs, the throughput of the sequential access rises from 5 MB/sec to 10 MB/sec although it doesn't need to rise. On the contrary, the IOPS which satisfies the mean response time of 30 milliseconds in the random access deteriorates from 50 IOPS to 25 IOPS although the user doesn't want to reduce it.

(Resource distribution between logic volumes)

In the conventional storage system, by arranging data having different performance requirements to the different disk apparatuses, their performance characteristics are drawn out. For example, data in which a guarantee of a response time is required in the random access of a small amount of data and data in which importance is attached to a processing amount per unit time in the sequential access of a large amount of data are arranged in the different disk apparatuses. In association with the realization of a large capacity of the disk apparatus, however, the case where the data having different performance requirements is arranged in the same disk apparatus is increasing. A similar problem occurs even when the logic volumes having different performance requirements are arranged to the same disk as mentioned above. Hitherto, there is not a mechanism for controlling a disk resource distribution between logic volumes by scheduling the received inputs/outputs by the FIFO. Therefore, when the input/output to/from a certain logic volume frequently occurs, input/output performance for the other logic volume deteriorates. For instance, in the case where a volume A in which it is desired to guarantee 10 IOPS and a volume B in which it is desired to guarantee 50 IOPS are arranged on the same disk, when the access to the volume A frequently occurs, the IOPS of the volume A rises from 10 IOPS to 20 IOPS though it doesn't need to rise. On the contrary, the IOPS of the volume B deteriorates from 50 IOPS to 40 IOPS though it is not desired to deteriorate it.

(Resource distribution between normal process and backup/copying process)

A case where a plurality of logic volumes exist on the same disk apparatus in the conventional storage system and a backup or a copying operation is performed on each logic volume unit basis will now be considered. Hitherto, in order to suppress the influence on the normal input/output by the backup/copying process, a method of setting paces (intervals) of the backup/copying process at the time of executing the backup/copying process is used. However, if the copying operation is executed to the volume B on the same disk apparatus as that of the volume A while the volume A is being copied, the duplex copying process is operated simultaneously on the same disk apparatus, so that the influence on the normal input/output is doubled.

(Resource distribution between normal process and rebuilding)

In the RAID apparatus, by making data redundant in a plurality of disk drives, even if a failure occurs in one disk drive, the data can be recovered from the remaining disk drives. In the RAID apparatus, therefore, even if the failure occurs in the disk drive, the ordinary input/output can be continued. A recovery of the data is performed to the exchanged disk drive from the remaining disk drives. The recovering process is called "rebuilding". Since the rebuilding is accompanied with the input/output process for the disk drives constructing the RAID apparatus, the rebuilding and the normal input/output scramble for the same disk drive. Consequently, the performance of the normal input/output is deteriorated by the rebuilding. For example, in case of RAID1 having a mirror construction, the rebuilding is a process for copying data from one disk drive which remains due to the failure of the other disk drive to the exchanged new disk drive and a read input/output occurs to the disk drive on the copying source side. The read input/output causes the normal input/output to wait, so that the performance of the normal input/output deteriorates. There are two conventional approaches to solve the problem. According to the first approach, enough small data is copied at an enough long interval so as not to exert an influence on the normal input/output. In this case, although the influence on the normal input/output can be reduced, time that is required until the rebuilding is completed becomes long. For instance, in case of RAID1 constructed by disk drives of 9 GB, time of about 10 hours is needed. As for the second approach, when the disk drive is vacant, namely, when the disk drive is not used in the normal input/output, the input/output of the rebuilding is scheduled. A problem in this case is a point that the time that is required until the completion of the rebuilding cannot be guaranteed. When the disk drive is hardly vacant, long time is needed for the rebuilding.

(Guarantee of maximum response time)

In a mission critical processing, as requirements of the input/output performance, the maximum response time is important in addition to the mean response time. The recent disk apparatus has a re-ordering function for rearranging inputs/outputs for which the execution is waited so as to minimize the processing time. The re-ordering function is a function such that an input/output to minimize a positioning time that is defined by the sum of a seeking time and a rotation waiting time is selected as an input/output to be subsequently executed from the execution waiting inputs and outputs by the disk apparatus. When the input/output is requested to the disk apparatus, a simple task serving as a task designation indicating that it can be set as a target of the re-ordering is notified to the disk apparatus. In case of the inputs/outputs of the simple task designation, the disk apparatus schedules the inputs and outputs in order so as to minimize the positioning time. Consequently, the mean processing time at the time of the random access is reduced. For instance, the mean processing time of the random access is reduced from 9 milliseconds to 5 milliseconds by using the re-ordering function. Although the re-ordering function improves the throughput of the disk apparatus as mentioned above, there is a problem that the maximum response time increases. This is because since the input/output to minimize the positioning time is selected as a next input/output, a phenomenon such that a certain input/output is kept waiting for a long time without being scheduled occurs. To solve such a phenomenon, the disk apparatus has a function to designate an ordered task in addition to the simple task to designate that the input/output can be set as a target of the re-ordering. When the input/output is requested by the designation of the ordered task, the disk apparatus completes all of the inputs and outputs which have been received so far but are not completed yet and, after that, schedules the input/output of the ordered task. In this manner, by mixing the ordered task between the simple tasks, it is possible to suppress the extension of the maximum response time of the input/output. However, in case of considering the resource distributions between the random access and the sequential access, between the logic volumes, between the normal process and the backup/copying process, and between the normal process and the rebuilding process, in addition to the use of the simple task to improve the throughput (IOPS), the guarantee of the maximum response time in case of using the simple task becomes a problem.

SUMMARY OF THE INVENTION

According to the invention, there are provided disk time-sharing apparatus and method which can guarantee the minimum value of performance when a plurality of different kinds of inputs and outputs to/from a disk apparatus compete with each other.

A disk time-sharing apparatus according to the invention comprises: a disk apparatus having one or a plurality of disk drives; an input/output request unit for issuing an input/output request to the disk apparatus; and an input/output scheduling unit for forming input/output groups obtained by grouping input/output sources to the disk apparatus, defining a ratio of time during which each input/output group uses the disk apparatus, deciding a quantum (allocating time) during which each input/output group can continuously use the disk apparatus on the basis of the defined time ratio, and in the case where the input/output requests are received from a plurality of input/output groups to the disk apparatus, performing a time-sharing such that the disk apparatus is used by sequentially switching the quanta among the competing input/output groups. When there is an input/output request only from one input/output group, the input/output scheduling unit enables the disk apparatus to be continuously used for the input/output from one input/output group. As mentioned above, according to the disk time-sharing apparatus of the invention, the minimum value of the input/output performance can be guaranteed every input/output group which has previously been defined and, when the requests from a specific input/output group are concentrated for a certain time zone, the maximum performance can be guaranteed for the specific input/output group.

Specifically speaking, the input/output scheduling unit makes the input/output determined to be a sequential access correspond to a sequential access input/output group, makes the other inputs/outputs correspond to a random access input/output group, and performs the time-sharing of the disk apparatus by the sequential access and the random access. Therefore, no matter how many random access requests are generated, since the time during which the disk apparatus can be used by the inputs/outputs of the sequential access is guaranteed, the minimum value of the sequential access performance can be guaranteed. Since the time during which the disk apparatus can be used by the inputs/outputs of the random access is guaranteed, the minimum value guarantee of the random access performance can be performed. In case of only the sequential access request, since the disk apparatus can be successively used only by the input/output request of the sequential access, the maximum performance of the sequential access can be guaranteed. Further, in case of only the random access request, since the disk apparatus can be continuously used only by the input/output request of the random access, the maximum performance of the random access can be guaranteed.

The input/output scheduling unit makes a plurality of logic volumes in which performance requirements are the same correspond to one input/output group and performs a time-sharing of the disk apparatus among logic volume groups in which performance requirements are different. Therefore, since the time during which the disk apparatus can be used by the input/output of an access to a certain logic volume is guaranteed, no matter how many input/output requests for the other logic volumes are generated, the minimum value of the input/output performance of each logic volume can be guaranteed. In case of only the input/output request for a certain logic volume, since the disk apparatus can be used continuously only by the input/output request of such a volume, the maximum performance of the input/output to this volume can be guaranteed.

The input/output scheduling unit of the disk time-sharing apparatus makes the inputs/outputs of the copy and backup processes correspond to one input/output group and performs a time-sharing of the disk apparatus between the copy and backup processes and the other process. Thus, even if the copy/backup processes operate on the same disk apparatus in an arbitrary multiplexing state, since the disk using time during which the disk apparatus can be used by the input/output of an ordinary process is guaranteed, the minimum value of the input/output performance of the ordinary process (process other than the copy/backup) can be guaranteed. Since the using time of the disk apparatus which can be used by the copy/backup processes is guaranteed, the minimum value of the accessing performance of the whole copy/backup processes can be guaranteed. In case of only the inputs/outputs of the copy/backup processes, since the disk apparatus can be used continuously only by the inputs/outputs of the copy/backup processes, the maximum performance of the copy/backup inputs/outputs can be guaranteed.

If the disk apparatus has an RAID construction such that it has a plurality of disk drives and even if one disk drive fails, data can be restored and rebuilt from another disk drive, the input/output scheduling unit makes the input/output of the rebuilding process of the disk apparatus having the RAID construction correspond to one input/output group and performs a time-sharing of the disk apparatus between the rebuilding process and the other process. Therefore, since the time during which the disk drive can be used by the input/output of the ordinary process is guaranteed, the input/output performance of the ordinary process during the rebuilding operation can be guaranteed. Since the time during which the disk drive can be used by the input/output of the rebuilding is guaranteed, the time that is required until the completion of the rebuilding can be guaranteed. Further, as compared with the conventional apparatus for performing the rebuilding operation at a predetermined interval, according to the disk time-sharing of the invention, since the rebuilding process can be executed when the ordinary input/output is not executed, the time that is required until the completion of the rebuilding can be reduced while the input/output performance of the ordinary process is guaranteed.

If the disk apparatus has an ordered task function such that a plurality of inputs/outputs are scheduled so as to minimize the positioning time by a designation of a simple task (first task) and inputs/outputs of the second task designation are scheduled after completion of the input/output during the reception by a designation of an ordered task (second task), the input/output scheduling unit separately schedules the designation of the simple task and the designation of the ordered task when the time-sharing of the disk apparatus is performed. That is, when the time-sharing in which the disk apparatus is sequentially used among a plurality of input/output groups is performed, the input/output scheduling unit designates the ordered task as for the first input/output just after the switching of the input/output group and, after completion of the inputs/outputs of the group before switching, schedules the inputs/outputs of the group after the switching, and designates the simple task as for the inputs/outputs until the group is switched subsequently and schedules a plurality of inputs/outputs so as to minimize the positioning time. Therefore, in one quantum, the disk apparatus can be used continuously for the inputs/outputs of a certain input/output group. The input/output scheduling unit predicts a processing time of the unprocessed inputs/outputs and calculates (predicts) a next quantum start time T0 when the quantum is switched. Each time the input/output request is received or a completion of the input/output request is responded, the input/output scheduling unit predicts a remaining time Tr on the basis of the processing time of the unprocessed input/output at that time and the quantum start time T0. When it is determined that there is the remaining time (Tr>0), an input/output request of the present quantum is inputted to the disk apparatus. When it is decided that there is no remaining time (Tr≦0), the present quantum is switched to the next quantum. To share in the benefit of the re-ordering, in the disk input/output scheduling unit, it is necessary to make an environment in which many inputs/outputs are requested to the disk apparatus. Therefore, in case of using the simple task, a plurality of input/output requests are asked to the disk apparatus. Since the disk time-sharing of the invention intends to perform a time-divisional control of the input/output processing time in the disk apparatus, when the input/output request is asked to the disk apparatus, it is necessary to predict the time which is necessary to process a plurality of asked requests by the disk apparatus, and after the present quantum is switched to the next quantum, discriminate whether an input/output of the kind of quantum after the switching is supplied to the disk apparatus or not. Therefore, the remaining time Tr is calculated by the following equations in order to discriminate whether the request asked at present to the disk drive at the time of quantum switching is completed in the next quantum and a new input/output request can be issued or not.

Remaining time $Tr$=quantum start time $T0$+quantum allocating time τ−unprocessed I/O processing time−present time Quantum start time $T0$=quantum switching time+unprocessed I/O processing time Unprocessed I/O processing time=the number of unprocessed I/O× I/O mean processing time In case of using the disk apparatus continuously for the inputs/outputs from one input/output group, the input/output scheduling unit designates the ordered task as for the first input/output just after the allocating time is reset, completes the input/output before the resetting, thereafter schedules the inputs/outputs after the resetting, and designates the simple task as for the inputs/outputs until the resetting is performed subsequently, and schedules a plurality of inputs/outputs so as to minimize the positioning time. Even in the case where the quanta of one input/output group continue as mentioned above, the first input/output for the disk apparatus after resetting the quantum in order to reset the quantum start time to the present time is asked by the ordered task, so that an extension of the response time as an obstacle which is caused by re-ordering the disk apparatus can be prevented.

According to the invention, there is provided a disk time-sharing method for an apparatus comprising: a disk apparatus having one or a plurality of disk drives; an input/output request unit for issuing an input/output request to the disk apparatus; and an input/output scheduling unit for scheduling the use of the disk apparatus on the basis of the input/output request. This disk time-sharing method comprises the steps of:

forming input/output groups obtained by grouping inputs/output sources to/from the disk apparatus and defining a ratio of time during which each input/output group uses the disk apparatus;

deciding a quantum τi (allocating time) during which each input/output group can use the disk apparatus continuously on the basis of the defined time ratio; and when input/output requests are received from the plurality of input/output groups to the disk apparatus, performing a time-sharing such that the disk apparatus is used by sequentially switching the quanta τi among the competing input/output groups.

The details of the disk time-sharing method are fundamentally the same as those of an apparatus construction.

The above and other objects, features, and advantages of the present invention will become more apparent from the following detailed description with reference to the drawings.

BRIEF DESCRIPTION OF THE DRAWINGS

FIGS. 2A and 2B are functional block diagrams of a fundamental embodiment of the invention in which three input/output groups are formed;

FIGS. 5A to 5J are explanatory diagrams of a predicting process of a remaining time when a quantum is switched;

FIGS. 6A and 6B are flowcharts for the disk time-sharing process in FIGS. 2A and 2B;

FIGS. 7A and 7B are functional block diagrams of an embodiment of the invention corresponding to input/output groups of a sequential access and a random access;

FIGS. 10A and 10B are functional block diagrams of an embodiment of the invention corresponding to input/output groups of a rebuilding process and ordinary processes;

DETAILED DESCRIPTION OF THE PREFERRED EMBODIMENTS

Figure 1:
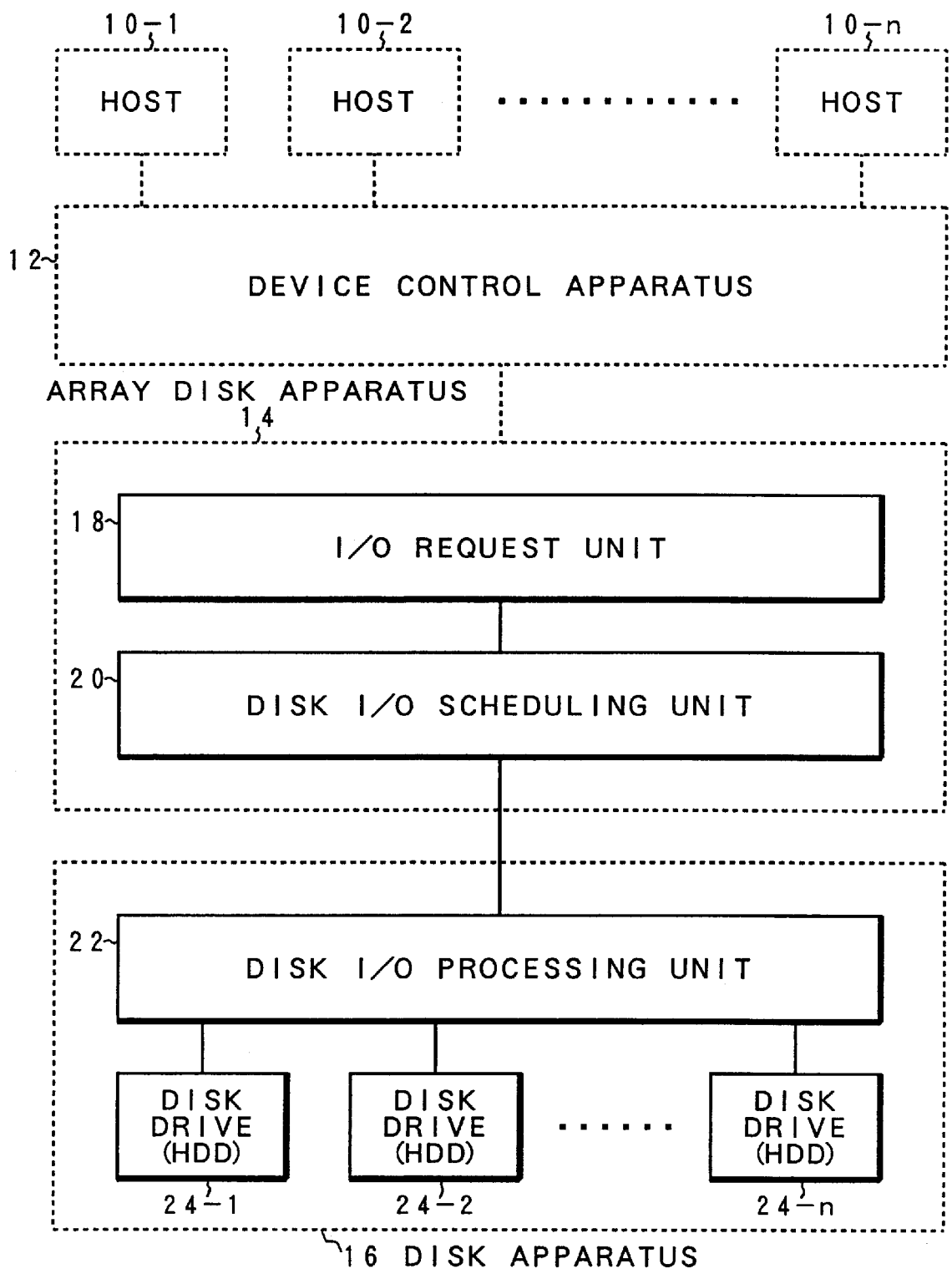
FIG. 1 is a block diagram of a storage system to which the invention is applied.

FIG. 1 is a block diagram of a storage system to which the invention is applied. The storage system comprises a device control apparatus 12, an array disk apparatus 14, and a disk apparatus 16. Hosts 10-1 to 10-n are connected to the device control apparatus 12 and input/output requests are asked to the device control apparatus 12 by applications of the hosts 10-1 to 10-n. The array disk apparatus 14 receives the input/output request from the device control apparatus 12 and issues the received input/output request to the disk apparatus 16. A disk time-sharing apparatus of the invention comprises: an input/output request unit 18 and a disk input/output scheduling unit 20 provided for the array disk apparatus 14; and a disk input/output processing unit 22 and disk drives 24-1 to 24-n provided for the disk apparatus 16. When a plurality of disk drives 24-1 to 24-n provided for the disk apparatus 16 have an RAID construction, an RAID control unit is further provided for the array disk apparatus 14.

Figure 2B:
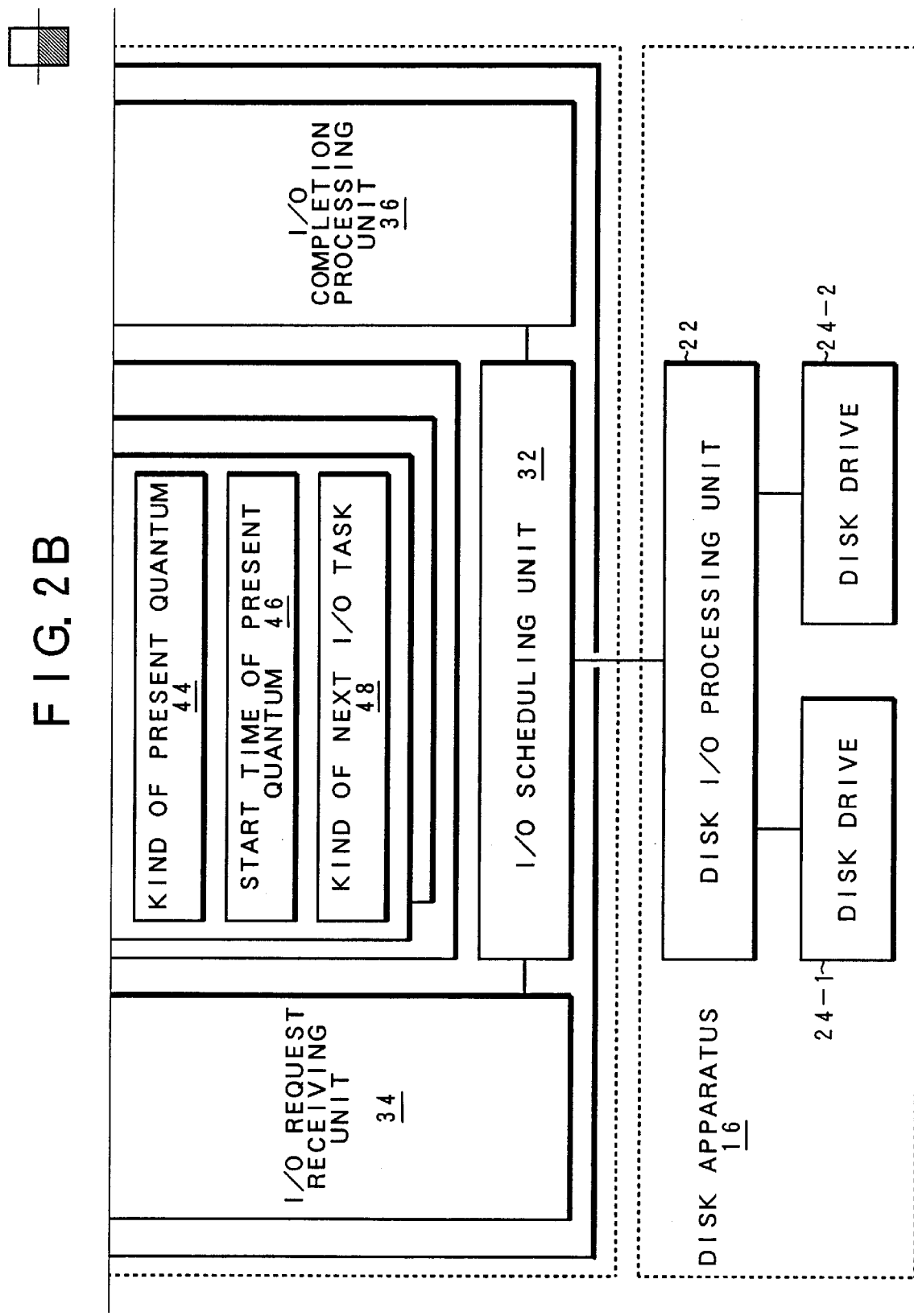

FIGS. 2A and 2B are block diagrams of a fundamental embodiment of the time-sharing apparatus of the invention applied to the storage system of FIG. 1, and show a disk apparatus of an RAID construction as an example. The array disk apparatus 14 comprises the input/output request unit 18, an RAID control unit 26, and the disk input/output scheduling unit 20. The disk input/output processing unit 22 is provided for the disk apparatus 16. Two disk drives 24-1 and 24-2 having, for example, a construction of RAID1 (mirror disk construction) are connected to the disk input/output processing unit 22. Such a disk time-sharing apparatus of the invention performs a scheduling process such that the input/output requests from the input/output request unit 18 to the disk apparatus 16 are grouped to thereby form input/output groups, a ratio of time during which each input/output group uses the disk apparatus 16 is defined, a quantum (allocating time) during which each input/output group can use the disk apparatus continuously on the basis of the defined time ratio is determined, the quanta are sequentially switched among the competing input/output groups when the requests are received from a plurality of input/output groups, and the disk apparatus 16 is used. When there is an input/output request from only one input/output group, the apparatus executes a scheduling such that the disk apparatus 16 can be used continuously for the inputs/outputs from one input/output group.

A construction and functions of each unit in FIGS. 2A and 2B to realize the disk time-sharing processes of the invention as mentioned above will be described further in detail hereinbelow. The input/output request unit 18 issues the input/output request for the disk apparatus 16 to the disk input/output scheduling unit 20 through the RAID control unit 26 on the basis of, for example, a command from the upper device control apparatus 12 shown in FIG. 1. The RAID control unit mainly performs a process to convert the asked logic input/output request into a physical input/output request. Disk time-sharing control information 30-1 and 30-2, an input/output scheduling unit 32, an input/output request receiving unit 34, and an input/output completion processing unit 36 are provided for the disk input/output scheduling unit 20. The disk time-sharing control information 30-1 and 30-2 is provided on a unit basis of the disk drives 24-1 and 24-2 provided for the disk apparatus 16. The input/output scheduling unit 32 performs a disk time-sharing by referring to and updating the disk time-sharing control information 30-1 and 30-2 provided on a unit basis of the disk drives 24-1 and 24-2. The disk time-sharing control information 30-1 will now be described. In the embodiment, a case where the input/output groups are divided into three groups G1, G2, and G3 and defined will be explained as an example. Schedule waiting group queues 38-1 to 38-3 are provided in correspondence to the input/output groups G1 to G3. By storing the input/output requests received by the input/output request receiving unit 34 into FIFOs constructing the queues, the input/output requests are arranged in the schedule waiting group queues 38-1 to 38-3. Completion waiting group queues 40-1, 40-2, and 40-3 are provided in correspondence to the input/output groups G1 to G3. The input/output requests such that the input/output request to the disk apparatus 16 is completed and an input/output completion response is not received from the disk apparatus 16 are stored into FIFOs constructing the queues, so that those input/output requests are arranged in the completion waiting group queues 40-1 to 40-3. Further, quanta 42-1, 42-2, and 42-3 for groups are provided in correspondence to the input/output groups G1 to G3. Ratios $\alpha 1$, $\alpha 2$, and $\alpha 3$ of the time during which the input/output groups G1 to G3 use the disk apparatus 16 are previously defined. On the basis of the defined ratios $\alpha 1$, $\alpha 2$, and $\alpha 3$, quanta $\tau 1$, $\tau 2$, and $\tau 3$ as allocating time during which the input/output groups G1 to G3 can use the disk apparatus continuously are determined and stored in the quanta 42-1 to 42-3 for groups. For example, now assuming that a time-sharing period when the time-sharing is performed once is set to Tc, the quanta τ1, τ2, and τ3 of the input/output groups G1 to G3 are defined by the following equations.

$$\tau 1 = \alpha 1 \cdot Tc$$

$$\tau 2 = \alpha 2 \cdot Tc$$

$$\tau 3 = \alpha 3 \cdot Tc$$

Proper values of the quanta τ1, τ2, and τ3 to decide the use of the disk apparatus 16 by the input/output groups G1 to G3 are determined as follows. First, if the value of quantum is too small, it is close to an input/output processing time of the disk apparatus 16, an effect of re-ordering to select the input/output so as to minimize the positioning time decreases, and whole input/output performance deteriorates. On the contrary, if the value of quantum is too large, a waiting time of the quantum that is required to switch the input/output group to another input/output group is extended, so that the mean input/output processing time and the maximum input/output processing time are extended. For example, now assuming that the quanta τ1 and τ2 are set to 1 hour respectively, since the input/output of the quantum τ2 cannot be executed during the process of the quantum τ1, the input/output of the quantum τ2 waits for one hour until the end of the quantum τ1. According to the experiments by the inventors of the present invention, in case of the disk apparatus 16 in which the mean processing time of the inputs/outputs lies within a range of a few milliseconds to 20 milliseconds, it is desirable that the value of the quantum lies within a range of tens of milliseconds to hundreds of milliseconds. There are, for example, the following groupings as inputs/outputs to be grouped by the disk input/output scheduling unit 20.

I. Grouping by the sequential access and the random access

II. Grouping by the logic volumes

III. Grouping of the copy/backup processes and ordinary processes

IV. Grouping of the rebuilding process of RAID and ordinary processes

The disk time-sharing process of the invention based on those four kinds of groupings of the inputs/outputs will be described in detail hereinlater, respectively. Further, a kind of present quantum 44, a start time of present quantum 46, and further, a kind of next input/output task 48 are provided for the disk time-sharing control information 30-1. The kind of present quantum 44 is provided every disk drives 24-1 and 24-2 of the disk apparatus 16. An identifier of the input/output group which uses the disk drives 24-1 and 24-2 at present is set. The start time of present quantum 46 is provided every disk drives 24-1 and 24-2 of the disk apparatus 16. Time T0 indicative of the start time of the present quantum set in the kind of present quantum 44 is set. Further, the kind of next input/output task 48 is provided every disk drives 24-1 and 24-2 of the disk apparatus 16. Information showing a result of a discrimination about whether the input/output request for the next disk drive is set to the simple task or the ordered task is set. The simple task or ordered task which is set in the kind of next input/output task 48 is performed to sufficiently effect the re-ordering function in the disk apparatus 16. The re-ordering function of the disk apparatus 16 is a function to select the input/output which minimizes a positioning time that is given by the sum of a seeking time and a rotating time as an input/output to be executed next from the execution waiting inputs/outputs with respect to each of the disk drives 24-1 and 24-2. In case of requesting the input/output to the disk apparatus having such a re-ordering function, if the simple task is designated, a message showing that it can be set to a target of the re-ordering is notified to the disk drive. The disk drive which received the input/output in which the simple task was designated schedules the inputs/outputs in order so as to minimize the positioning time. However, since the re-ordering function always selects the input/output such that the positioning time is the minimum, a phenomenon such that a certain input/output is not scheduled in a waiting state for a long time occurs. To solve such a phenomenon, the disk drive has an ordered task function besides the simple task. When the ordered task is designated and the input/output is requested, the disk drive completes all of the inputs/outputs which were inherited so far and are not completed enough and, thereafter, schedules the inputs/outputs of the ordered task. Therefore, the extension of the maximum response time of the input/output can be suppressed by mixing the ordered task between the simple tasks. In the disk time-sharing process of the invention, the first input/output after the quantum was switched is requested to the disk apparatus 16 by designating the ordered task, and after the input/output which is not completed enough before the switching of the quantum is completed, the input/output of the next quantum is executed. Therefore, the simple task is designated with respect to the second and subsequent inputs/outputs after switching to the quantum. In the case where there are the inputs/outputs only from one input/output group, to continue the scheduling of this input/output group, it is repeated while resetting the quantum. In this case, the first input/output just after the quantum is reset is requested by the ordered task and after all of the inputs/outputs which are not completed yet in the previous quantum are completed, the inputs/outputs of the quantum after the resetting are scheduled. Therefore, the extension of the maximum response time in the case where the inputs/outputs of a plurality of input/output groups compete and the case where the inputs/outputs of only one input/output group are continued can be prevented.

Figure 3:
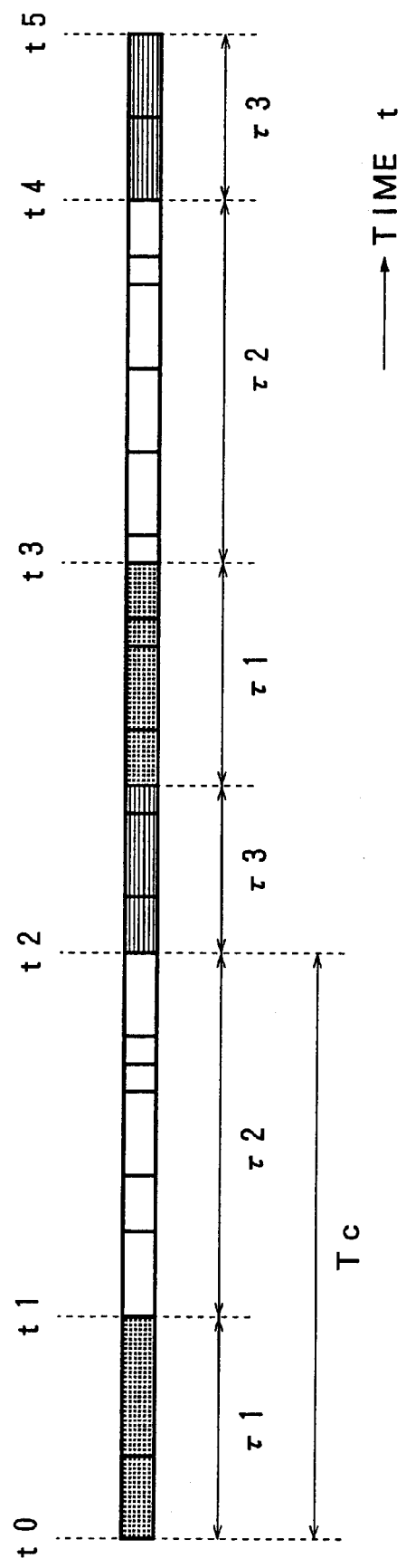
FIG. 3 is an explanatory diagram of a scheduling of a disk time-sharing process in the case where inputs/outputs of the three input/output groups in FIGS. 2A and 2B are used as targets.

FIG. 3 shows an example of a scheduling of the disk time-sharing by the input/output scheduling unit 32 provided for the disk input/output scheduling unit 20 in FIGS. 2A and 2B. With respect to the input/output groups G1 to G3, in a competing state where the input/output requests have been stored in the schedule waiting group queues 38-1 to 38-3 of the disk time-sharing control information 30-1, the inputs/outputs are scheduled in order of the groups G1 to G3 in accordance with the quantum waiting time τ1, τ2, and τ3 determined every input/output groups G1 to G3 and the input/output is requested to the disk apparatus 16. For example, two inputs/outputs of the input/output group G1 are scheduled for the quantum waiting time τ1 from time t0. The quantum is switched to the quantum of the next input/output group at a point when the time at a point of the completion of the input/output exceeds the present quantum switching time. This switching is discriminated by the following expression.

(input/output start time of present quantum)<(present quantum start time+quantum)    (1)

That is, if the expression (1) is satisfied, the input/output of the input/output group G1 corresponding to the present quantum kind is requested to the disk apparatus. If it is not satisfied, the quantum is switched to the quantum of the next input/output group G2. For example, six inputs/outputs are scheduled for the quantum waiting time τ2 of the next input/output group G2. Further, when the quantum waiting time τ2 elapses at time t2, the time is switched to the quantum waiting time τ3 of the input/output group G3. For example, three inputs/outputs of the input/output group G3 are scheduled. In a manner similar to the above, the quantum waiting time τ1, τ2, and τ3 are switched and the inputs/outputs of the input/output groups are scheduled.

Figure 4:
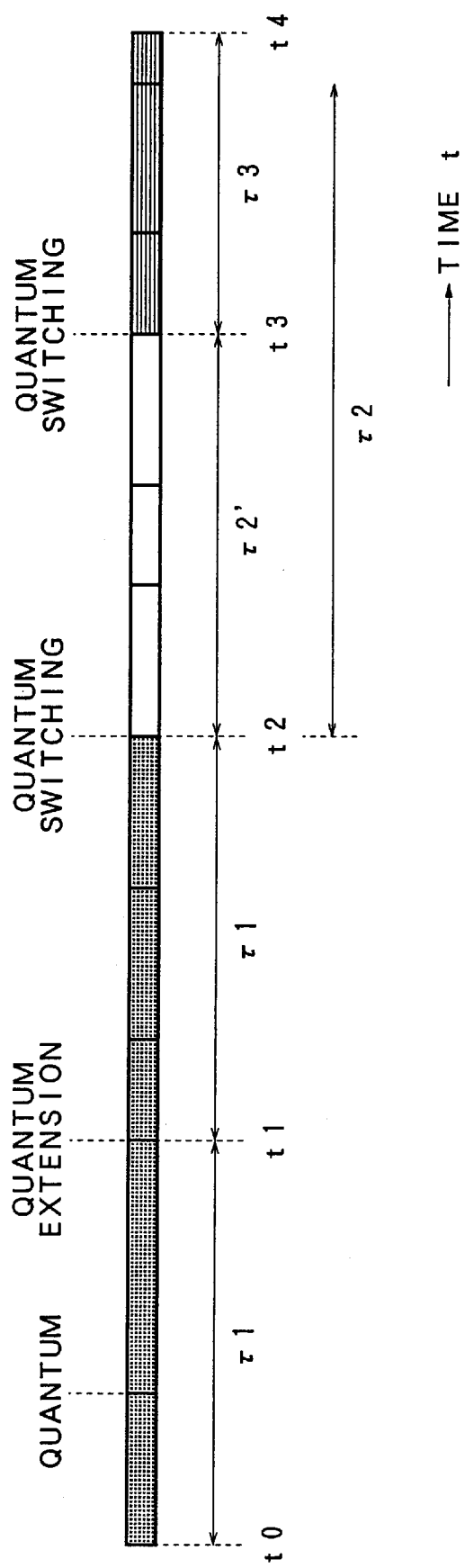
FIG. 4 is an explanatory diagram of a scheduling of a disk time-sharing process in the case where inputs/outputs of only one input/output group continue.

FIG. 4 shows an example of the time-sharing process in the case where only the inputs/outputs of a specific input/output group continue. It is assumed that the inputs/outputs of only the input/output group G1 are arranged in the schedule waiting group queue 38-1 in FIGS. 2A and 2B at time t0 and the schedule waiting group queues 38-2 and 38-3 of the remaining input/output groups G2 and G3 are empty. In this case, after the two inputs/outputs of the input/output group G1 are scheduled at the quantum waiting time τ1 of the input/output group G1 from time t0, by resetting the quantum waiting time τ1 at time t1, the quantum waiting time τ1 of the next same input/output group G1 is restarted and, for example, three inputs/outputs are scheduled. When only the inputs/outputs of one input/output group are in the waiting state as mentioned above, by resetting its quantum, the inputs/outputs of one input/output group are scheduled continuously. Further, in FIG. 4, since the inputs/outputs of three input/output groups G1 to G3 enter the competing state at time t2, the time is switched to the next quantum waiting time τ2. However, there are only three inputs/outputs of the input/output group G2 in the quantum waiting time τ2 and three input/output requests are extinguished at time t3 in the half of the quantum waiting time τ2. In this case, for example, since the input/output request in the waiting state exists in the input/output group G3, the time is switched to the quantum waiting time τ3 at time t3 and, for instance, three inputs/outputs of the input/output group G3 are scheduled.

In the schedules of the disk time-sharing shown in FIGS. 3 and 4, as for the request of the input/output to the disk drive, the input/output just after the switching of the quantum is requested by the ordered task and the inputs/outputs until the next quantum switching at the second and subsequent times are requested by the simple task. As mentioned above, to effect the re-ordering function of the disk drives 24-1 and 24-2, when the quantum is switched, the time that is required until all of the input/output requests asked at present to the disk drives 24-1 and 24-2 are completed is predicted. If the predicted time is within the quantum after the switching, the input/output of the quantum is requested after the switching. When the predicted time exceeds the quantum after the switching, the input/output after the switching is not requested but the apparatus waits for the switching to the next quantum. This is because in order to share in the benefit of the re-ordering of the disk apparatus 16, an environment to request the inputs/outputs to the disk apparatus 16 as many as possible is formed in the disk input/output scheduling unit 20. In case of using the simple task, a plurality of inputs/outputs are requested to the disk apparatus. Since the disk time-sharing of the invention intends to perform the time-divisional control of the input/output processing time in the disk apparatus, when the input/output request is asked to the disk apparatus, it is necessary to predict the time that is required to process a plurality of asked requests by the disk apparatus and discriminate whether the input/output of the quantum kind after the quantum switching is supplied to the disk apparatus after the quantum is switched to the next quantum or not.

Therefore, a remaining time τr is calculated by the following equations in order to discriminate whether the request asked at present to the disk drive upon quantum switching is completed in the next quantum and a new input/output request can be asked or not.

$$\tau r = T0 + \tau - Tw - Tnow \quad (2)$$

where,

T0: quantum start time (prediction value)

τ: quantum allocating time

Tw: unprocessed I/O processing time (prediction value)

Tnow: present time $$T0 = Ts + Tw \quad (3)$$

where, Ts: quantum start time before switching $$Tw = N \times Ta \quad (4)$$

where,

N: the number of unprocessed I/O

Ta: mean processing time of I/O for every access kind

The unprocessed I/O denotes an input/output such that although the input/output request has been supplied to the disk apparatus, a completion response is not returned. As for the unprocessed I/O, in case of the embodiment of the invention, there are a previous unprocessed I/O, a two-previous unprocessed I/O, and. all unprocessed I/O. They denote the unprocessed I/O of the quantum just before the present quantum, the unprocessed I/O of the two-previous quantum, and the unprocessed I/O through all quanta. The quantum start time T0 is also the prediction value and is predicted when the switching to the present quantum is determined by predicting the remaining time of the previous quantum. At this time, the time Tw that is necessary to complete all of the processes of the unprocessed I/O of the previous quantum on the disk apparatus is predicted by the equation (4). The end time of the previous quantum on the disk apparatus, namely, the start time T0 of the present quantum is predicted by the equation (3). The remaining time Tr of the equation (2) is calculated when the disk input/output scheduling unit receives the new input/output or when the completion response of the input/output is received from the disk apparatus. If the remaining time Tr is $$Tr > 0$$

it is decided that there is the remaining time. The input/output of the present quantum is supplied to the disk apparatus. If $$Tr \leq 0$$

it is determined that there is no remaining time. The quantum is switched.

As a calculating method of the mean input/output processing time Ta of the disk drive which is used to calculate the remaining time Tr of the equation (2), for example, a mean value of n input/output processing time just before is used as Ta. In this case, for example, it can be set to a finite value (n=10) or an infinite value (n=∞), namely, a mean value of all of the inputs/outputs from the start of the system can be also used. Further, as for the calculation of the mean value of the input/output processing time, either a method of calculating a mean value every input/output group or a method of calculating a mean value of all of the input/output groups can be used. In case of accessing a large quantity of data, since the positioning time is shorter than the data transfer time, the mean input/output processing time Ta is predicted from the amount of data to be accessed and a transfer ability of the disk drive. In this case, the positioning time differs depending on to which degree of benefit of the re-ordering function the apparatus can share, namely, the number of inputs/outputs of the re-ordering target in the disk drive at that time, a degree of distribution of addresses of the individual input/output request, or the like. However, in case of accessing a large quantity of data, since the ratio of the positioning time which occupies the processing time is small, the processing time is predicted as follows in this case.

(mean positioning time)+(data transfer time)

For example, in case of accessing data of 1 MB by the disk drive in which a transfer speed is equal to 20 MB/sec and a mean rotation waiting time is equal to 3 milliseconds and a mean seeking time is equal to 5 milliseconds, although the mean positioning time is equal to 8 milliseconds, since the transfer time is equal to 52 milliseconds, the processing time is set to 60 milliseconds by adding both of them.

FIGS. 5A to 5J show examples of the remaining time prediction at the time of the quantum switching and relate to the example of a case of alternately repeating the sequential quantum and the random quantum. FIGS. 5A and 5B show an example in which the next quantum start time T0 is predicted when switching from the random quantum to the sequential quantum. It is now assumed that the remaining time of the random quantum lacks at the present time Tnow when the quantum is switched to the random quantum. In this instance, a completion response in which there is one sequential I/O request of the previous quantum and there are three random I/O requests of the present quantum is not returned, and the request is being processed in the disk apparatus. In this case, as shown in FIG. 5B, time Tw1 that is required until all of the inputs/outputs which have been supplied to the disk apparatus and are being processed at present are completed is predicted by the equation (4). The start time T0 of the next sequential quantum is determined by the equation (2). The quantum is switched to the sequential quantum. FIGS. 5C to 5F show an example in which it is determined that there is the remaining time by the remaining time prediction. In FIG. 5B, it is assumed that after the quantum is switched to the sequential quantum, the disk input/output scheduling unit receives one sequential I/O request at the present time Tnow. At this time, there is one request of random I/O as an unprocessed I/O in which a completion response is not returned although it is the I/O request asked to the disk apparatus. That is, the disk apparatus is processing one request of the random I/O of the previous quantum. In this case, as shown in FIG. 5E, time Tw2 that is required until the disk apparatus completes one request of the random I/O is predicted by the equation (4). A remaining time Tr2 is obtained as shown in FIG. 5F by the equation (2) by using the quantum start time T0 obtained in FIG. 5B. In this case, since Tr2>0, the sequential I/O can be supplied to the disk apparatus. FIGS. 5G to 5J show an example in which it is decided that there is no remaining time by the remaining time prediction. It is assumed that time has further elapsed and the disk input/output scheduling unit receives one request of a sequential I/O at the present time Tnow in FIG. 5G. At this time, there is one request of the sequential I/O as an unprocessed I/O in which the completion response is not returned although it is the I/O request asked to the disk apparatus. That is, the disk apparatus is processing one request of the sequential I/O of the present quantum. In this case, as shown in FIG. 5I, time Tw3 that is required until one request of the sequential I/O is completed by the disk apparatus is predicted by the equation (4). A remaining time Tr3 is obtained as shown in FIG. 5J by the equation (2) by using the quantum start time T0 obtained in FIG. 5B. In this case, since $Tr3 \leq 0$, it is decided that there is no remaining time. The quantum is switched to the next random quantum.

Figure 6B:
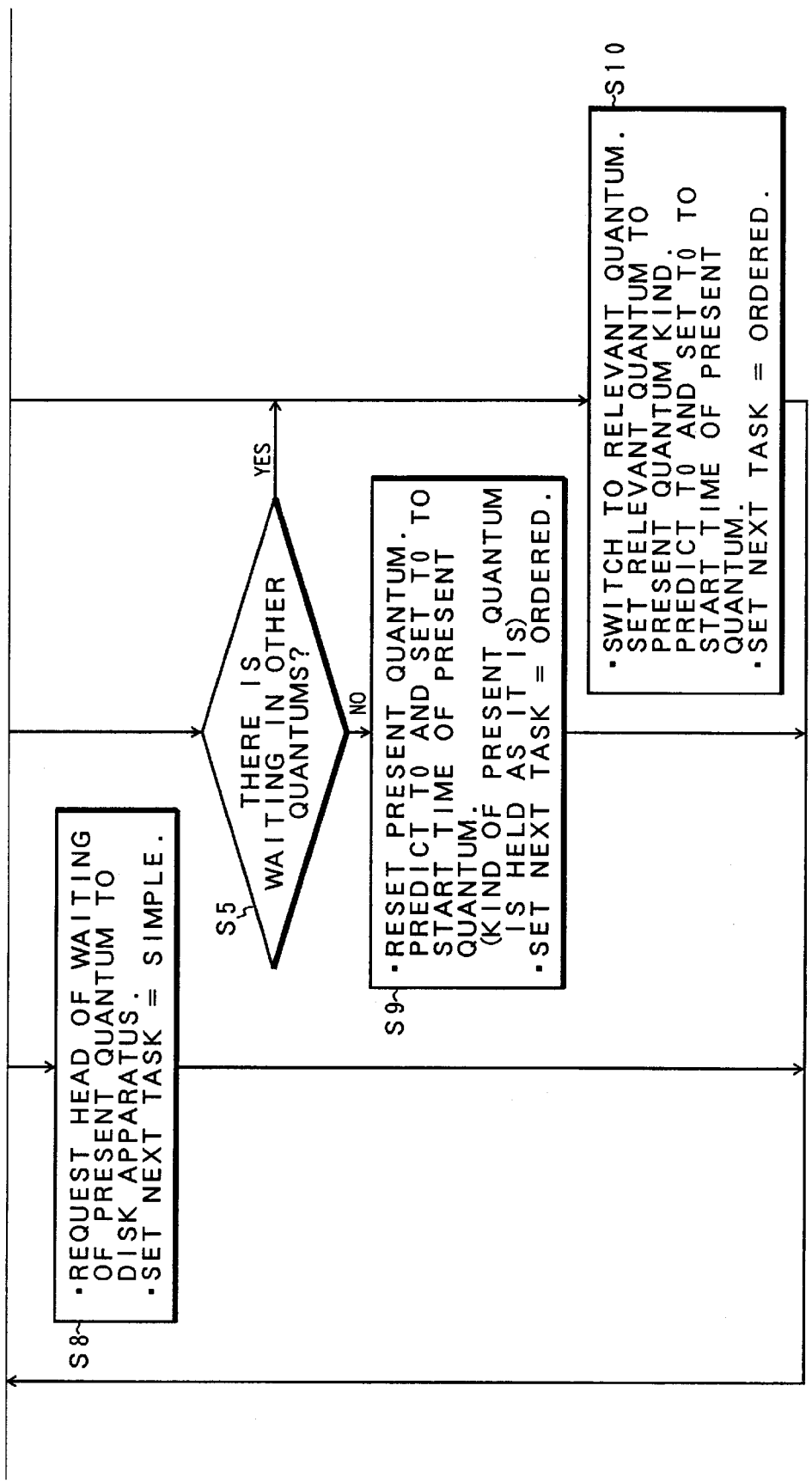

FIGS. 6A and 6B are flowcharts for a disk time-sharing control process of the invention by the input/output scheduling unit 32 provided for the disk input/output scheduling unit 20 in FIGS. 2A and 2B. The disk time-sharing control process by the input/output scheduling unit 32 operates when the input/output request receiving unit 34 receives a call when a certain input/output request is received from the input/output request unit 18 or receives a call from a timing when a completion report for the input/output requested to the disk apparatus 16 is received by the input/output completion processing unit 36. First, as shown in the schedule in FIG. 3, a case where in the disk input/output scheduling unit 20 in FIGS. 2A and 2B, the quanta are sequentially switched among the three competing input/output groups and the time-sharing of the disk drive 24-1 is performed will be described. In step S1, the schedule waiting group queue 38-1 corresponding to the quantum identifier i=1 set to the present quantum kind is checked, thereby discriminating the presence or absence of the waiting input/output. When there is the waiting input/output in the schedule waiting group queue 38-1, step S2 follows and whether the input/output which is not completed enough exists in the two-previous quantum or not is discriminated. Now assuming that the quantum identifier i=1 indicates the first schedule, since the uncompleted input/output does not exist in the two-previous quantum, step S3 follows and the remaining time Tr is predicted from the equation (2). Subsequently, whether the remaining time Tr (Tr>0) or not is discriminated in step S4. If this condition is satisfied, the presence of the remaining time is decided and step S8 follows. In step S4, the head input/output of the schedule waiting group queue 38-1 of the present quantum is requested to the disk drive 24-1 through the disk input/output processing unit 22 of the disk apparatus 16, and the task of the next input/output task kind information 48 is set to the simple task. The processing routine is returned to step S1 and a check is made to see if there is a waiting input/output in the schedule waiting group queue 38-1 of the present quantum. If YES, the processes in steps S2, S3, and S8 are repeated. In step S3, $Tr \leq 0$ by the scheduling of the inputs/outputs at the quantum waiting time τ1 of the input/output group G1 as mentioned above. If the absence of the remaining time is determined, step S5 follows and a check is made to see if there are waiting inputs/outputs in the schedule waiting group queues 38-2 and 38-3 of the other input/output groups G2 and G3. If there are the waiting inputs/outputs in the schedule waiting group queue 38-2 of the next input/output group G2 at this time, step S10 follows. The time is switched to the quantum waiting time τ2 of the next input/output group G2 and the next task is set to the ordered task with respect to the next input/output task kind information 48. At the same time, the quantum present time T0 is predicted from the equation (3) and the predicted time T0 is set to the present quantum start time. Thus, the time is switched from the quantum waiting time τ1 of the first input/output group G1 to the quantum waiting time τ2 of the next input/output group G2. The processing routine is returned to step S1 and the next input/output group G2 in association with the quantum switching is processed in steps S2, S3, S4, and S8. In this instance, since the next task is set to the ordered task in step S10, the first input/output after the quantum switching is requested to the disk drive 24-1 by the designation of the ordered task. After the request is made, the task of the next input/output task kind information 48 is set to the simple task. Subsequently, processes in the case where the input/output requests of one input/output group, for example, the input/output group G1 continue as shown in FIG. 4 will now be described. When the input/output request of the same input/output group G1 is received continuously, the processes in steps S1 to S4 are repeated at quantum t1 and the input/output request of the same input/output group is requested to the disk drive 24-1. If the absence of the remaining time is determined in step S4 for such a requesting period of time, step S5 follows and a check is made to see if there are waiting inputs/outputs in the schedule waiting group queues 38-2 and 38-3 of the other input/output groups. In this instance, if there is no waiting input/output in the schedule waiting group queues 38-2 and 38-3 of the other input/output groups G2 and G3 and they are vacant, step S9 follows. The present quantum waiting time τ1 is reset and the next task is set to the ordered task. At the same time, the quantum present time T0 is predicted and set to the present quantum start time. The processing routine is returned to step S1. In this case, the present quantum kind is held as it is. Therefore, the next quantum after resetting the present quantum waiting time τ1 also becomes the same quantum waiting time τ1. When the input/output request of the input/output group G1 continues, the same quantum τ1 is continued. It is now assumed the input/output request of the same input/output group G1 continues for a period of time between time t0 and time t2 as shown at time t2 and subsequent time in FIG. 4, the quanta τ1 and τ2 continue by resetting, and the input/output requests of the two remaining input/output groups G2 and G3 are received until time t2 and stored in the schedule waiting group queues 38-2 and 38-3, respectively. In this case, the quantum waiting time is switched to the quantum waiting time τ2 of the next input/output group G2. However, if the schedule waiting group queue 38-2 of the input/output group G2 becomes vacant on the halfway of the quantum waiting time τ2 as shown at time t3 in FIG. 4 and the absence of the waiting queue is determined in step S1, step S6 follows. A check is made to see if there are waiting inputs/outputs in the schedule waiting group queues 38-1 and 38-3 with respect to the other quanta. At this time, if there is the waiting input/output in the other quantum, step S10 follows and whether there are uncompleted inputs/outputs in all of the quanta or not is discriminated. If there is no uncompleted input/output, step S11 follows. The quantum waiting time is switched to the quantum waiting time τ3 of the next input/output group G3, the next task is set to the ordered task, further, the quantum start time T0 is predicted and set, and the processing routine is returned to step S1. Thus, the first input/output request of the input/output group G3 after the switching is asked to the disk drive 24-1 by the ordered task through the processes in steps S1 to S4 and S8.

Figure 7A:
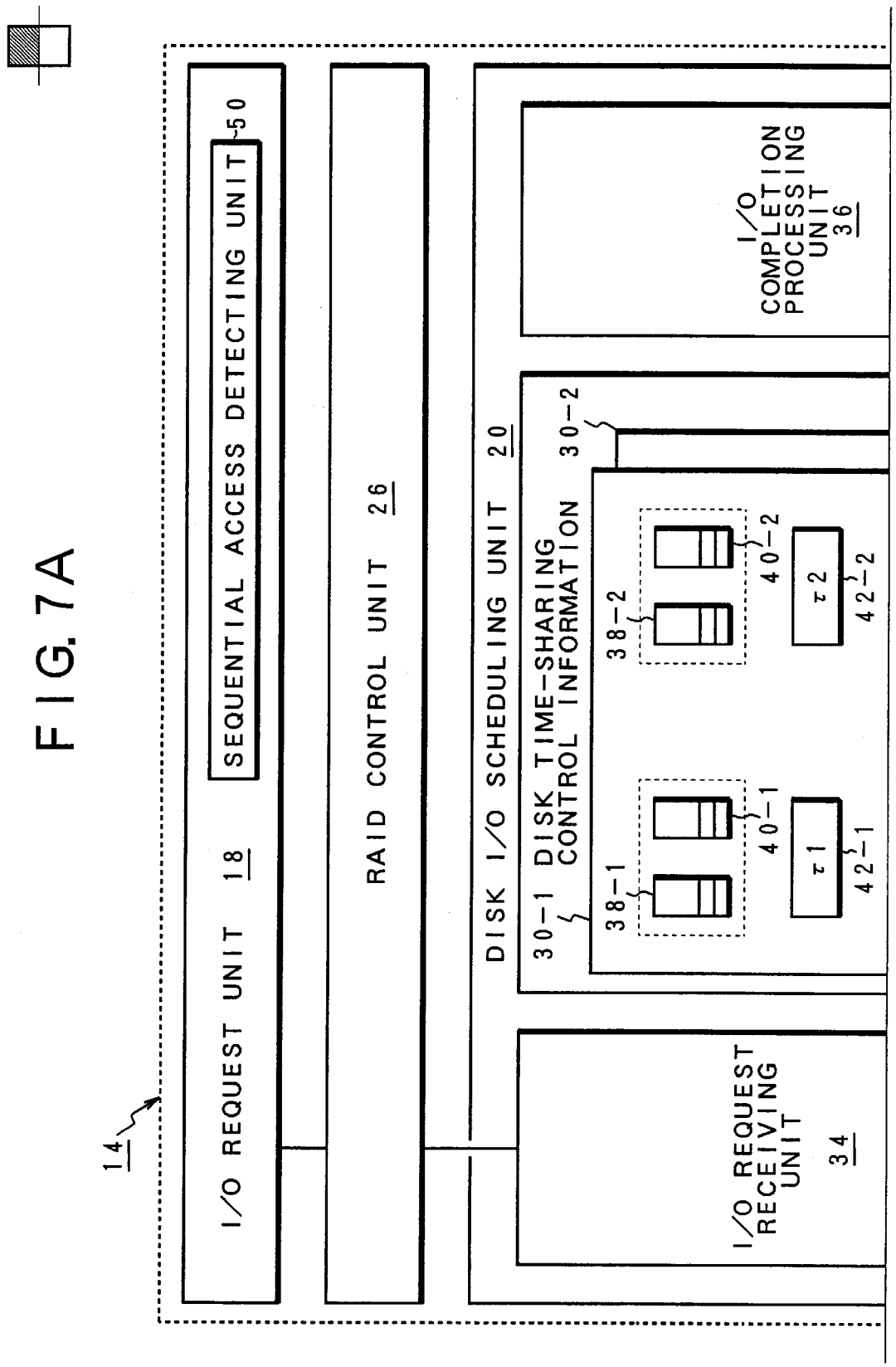

FIGS. 7A and 7B are block diagrams of an embodiment according to the invention in the case where the inputs/outputs are grouped with respect to the sequential access and the random access. In a manner similar to the embodiment of FIGS. 2A and 2B, the disk sharing apparatus of the invention provided for the array disk apparatus 14 and disk apparatus 16 comprises: the input/output request unit 18; RAID control unit 26; disk input/output scheduling unit 20; disk input/output processing unit 22; and disk drives 24-1 and 24-2. Since the inputs/outputs are now grouped into the input/output group for the sequential access and the input/output group for the random access by the disk input/output scheduling unit 20, a sequential access detecting unit 50 is provided for the input/output request unit 18. At this time, an interface to notify the input/output request interface for the RAID control unit 26 of a fact that the inputs/outputs are the inputs/outputs for the sequential access detected by the sequential access detecting unit 50 is added. The sequential access detecting unit 50 recognizes the address of the next input/output command from the address and data length included in the input/output command issued from the upper device control apparatus 12 shown in FIG. 1. When the address of the next input/output command coincides with the predicted address, the sequential access detecting unit 50 detects the sequential access and issues information such as a flag or the like indicative of the sequential access to the input/output request receiving unit 34 of the disk input/output scheduling unit 20 through the RAID control unit 26 by the interface. Therefore, the input/output request receiving unit 34 can recognize whether the access is the sequential access or the random access with respect to the input/output request received from the input/output request unit 18. The disk time-sharing control information 30-1 and 30-2 of the disk input/output scheduling unit 20 is provided in correspondence to the disk drives 24-1 and 24-2 of the disk apparatus 16. For example, when considering the disk time-sharing control information 30-1 (shown in the diagram) corresponding to the disk drive 24-1, since the input/output groups are classified into the sequential access group and the random access group, the schedule waiting group queues 38-1 and 38-2 and completion waiting group queues 40-1 and 40-2 are provided in correspondence to those two groups. Further, the quantum waiting time τ1 and τ2 is set to the quanta for groups 42-1 and 42-2 in correspondence to the sequential access and the random access, respectively. The present quantum kind information 44, present quantum start time 46, and next input/output task kind information 48 are similar to those in the embodiment of FIGS. 2A and 2B and set for each of the disk drives 24-1 and 24-2. In the embodiment of FIGS. 7A and 7B, therefore, when the input/output is requested from the input/output request unit 18 to the disk input/output scheduling unit 20, the inputs/outputs whose accessing mode is determined to be the sequential access by the sequential access detecting unit 50 are stored into the schedule waiting group queue 38-1 of the sequential access group in the disk time-sharing control information 30-1 and 30-2. The other inputs/outputs are determined that they belong to the random access group and stored into the schedule waiting group queue 38-2. The input/output requests of the sequential access and the input/output requests of the random access which were stored in the schedule waiting group queues 38-1 and 38-2 as mentioned above are sequentially sent to the disk apparatus 16 on the basis of the schedule according to a ratio of the quantum waiting time τ1 and τ2 decided with respect to them and the time-sharing input/output is performed. When the random access and the sequential access mixedly exist for the same disk drive as mentioned above, the minimum value can be guaranteed by the disk time-sharing control process of the invention shown in FIGS. 6A and 6B with respect to each of the random access performance and the sequential access performance.

Figure 8A:
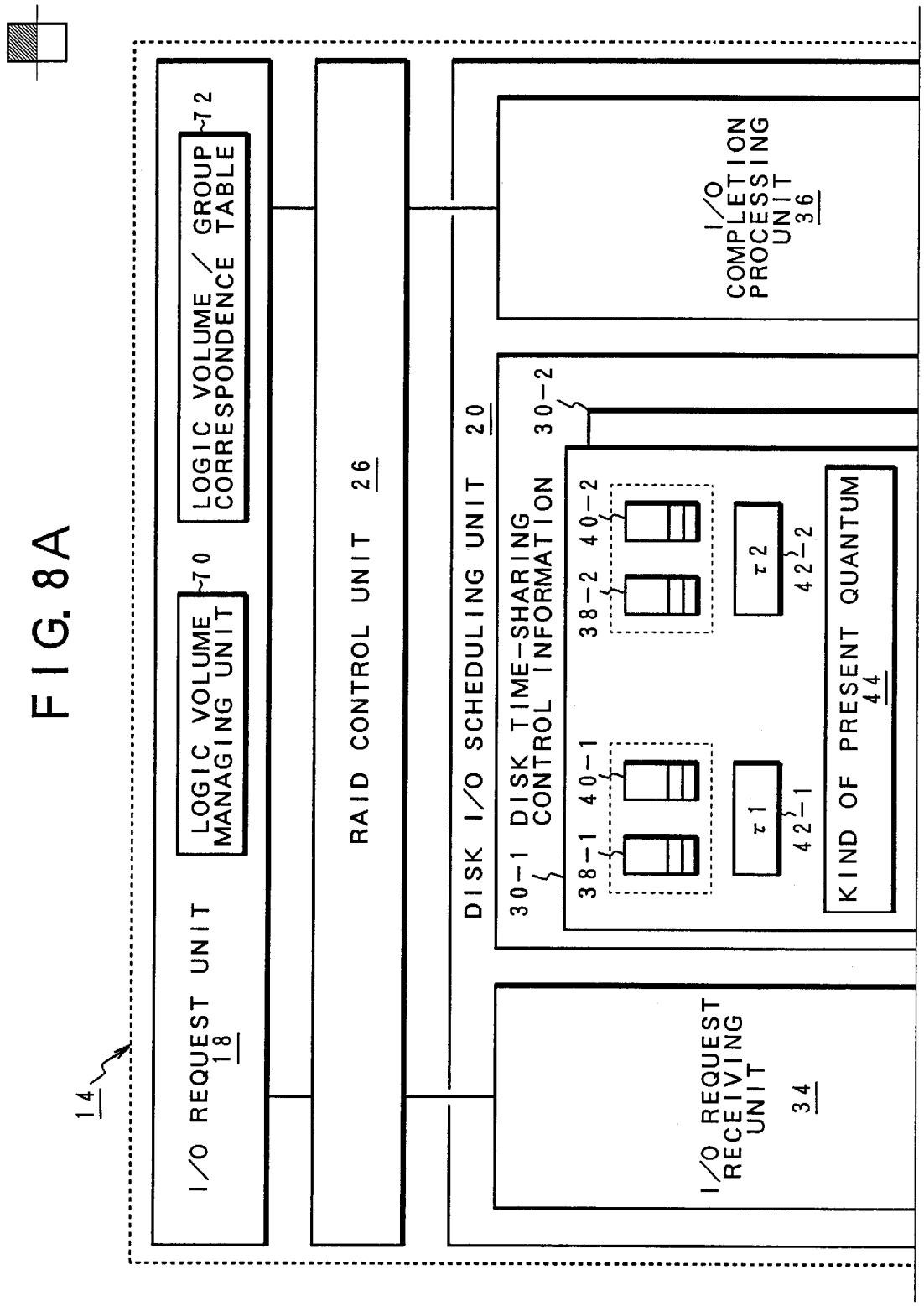
FIGS. 8A and 8B are functional block diagrams of an embodiment of the invention corresponding to input/output groups of logic volumes.
Figure 8B:
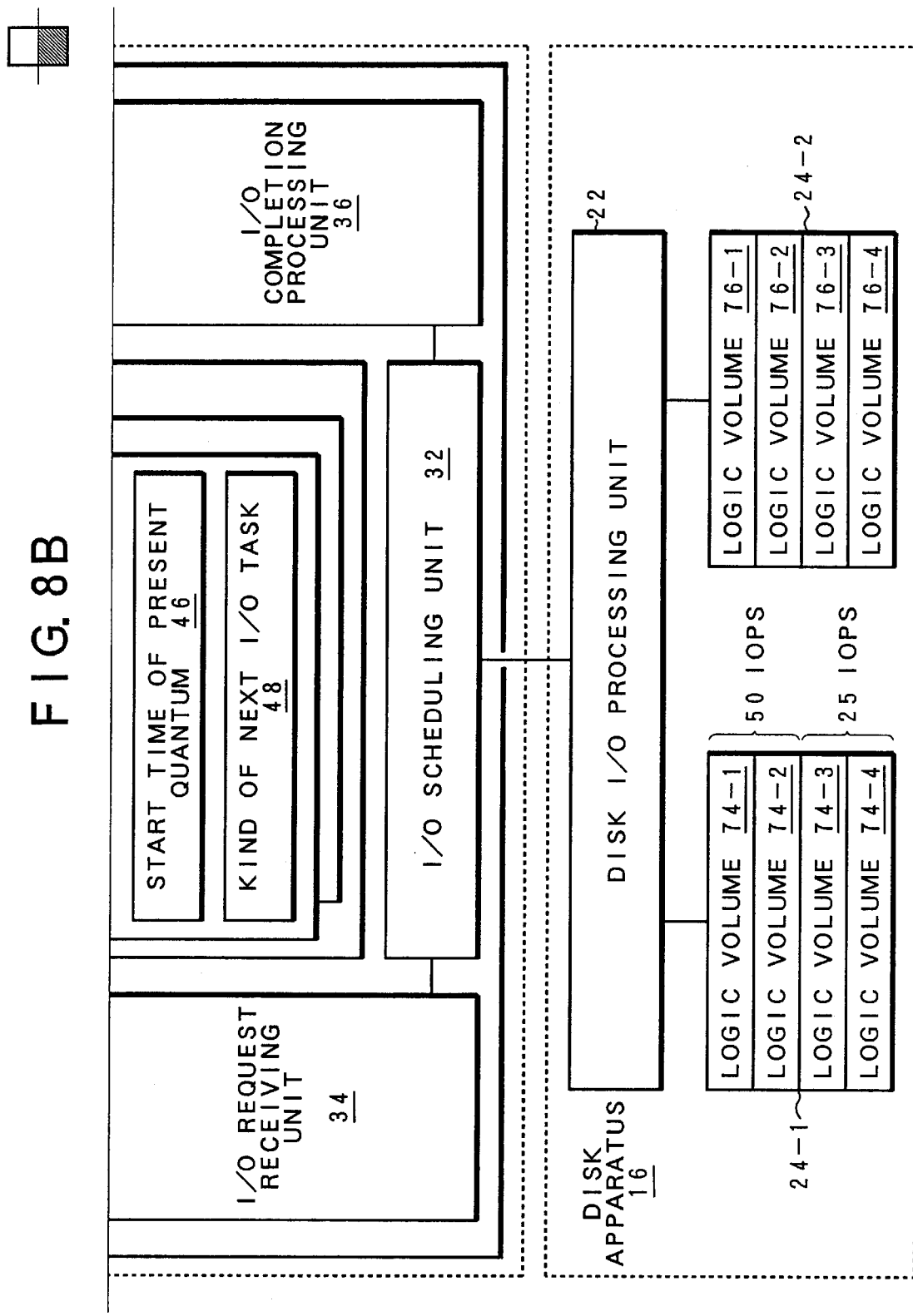

FIGS. 8A and 8B are block diagrams of an embodiment of the invention in which the logic volumes of the same performance requirements are made to correspond to one input/output group. In a manner similar to the embodiment of FIGS. 2A and 2B, the disk time-sharing apparatus comprises the input/output request unit 18, RAID control unit 26, disk input/output scheduling unit 20, disk input/output processing unit 22, and disk drives 24-1 and 24-2, and is built in the array disk apparatus 14 and disk apparatus 16 as shown in FIG. 1. For example, four logic volumes 74-1 to 74-4 are arranged in the disk drive 24-1 and four logic volumes 76-1 to 76-4 are arranged in the disk drive 24-2, respectively. As a peculiar performance requirement, for example, the throughput IOPS is allocated to each of the logic volumes 74-1 to 74-4 and 76-1 to 76-4. For example, the logic volumes 74-1 and 74-2 are set to the throughput of 25 IOPS and the logic volumes 74-3 and 74-4 are set to the throughput of 50 IOPS, respectively. The logic volumes 74-1 to 74-4 of the disk drive 24-1 are managed by a logic volume managing unit 70 provided for the input/output request unit 18. A logic volume/group correspondence table 72 is provided to make the same logic volume correspond to one input/output group as a performance requirement in the invention. In the logic volume/group correspondence table 72, for example, with respect to the disk drive 24-1, the logic volumes 74-1 and 74-2 having the throughput of 50 IOPS are made correspond to the input/output group G1, and the logic volumes 74-3 and 74-4 having the throughput of 25 IOPS are made correspond to the input/output group G2. At this time, an interface to notify the input/output request interface for the RAID control unit 26 of a fact that the inputs/outputs are the inputs/outputs of the logic group recognized with reference to the logic volume/group correspondence table 72 by the logic volume managing unit is added. Therefore, in case of requesting the input/output from the input/output request unit 18 to the disk input/output scheduling unit 20 through the RAID control unit 26, the group to which the logic volume to perform the input/output request belongs is searched with reference to the logic volume/group correspondence table 72 by the logic volume managing unit 70. The input/output request is performed to the disk input/output scheduling unit 20 together with the information showing the input/output group. Therefore, when the input/output is received from the input/output request unit 18, the input/output request receiving unit 34 of the disk input/output scheduling unit 20 recognizes whether the input/output group is the input/output group G1 of the logic volumes 74-1 and 74-2 or the input/output group G2 of the logic volumes 74-3 and 74-4 from the group information added to the received input/output. In the input/output group G1, the input/output request is stored as a queue into the schedule waiting group queue 38-1 of the disk time-sharing control information 30-1. In the input/output group G2, the received input/output request is stored into the schedule waiting group queue 38-2. The quantum waiting time $\tau 1$ and $\tau 2$ of each group has been set to the quanta for groups 42-1 and 42-2 in correspondence to the input/output groups G1 and G2 classified by the same performance. Further, the present quantum kind information 44, present quantum start time 46, and further, next input/output task kind information 48 are set for each of the disk drives 24-1 and 24-2. Even in the case where the input/output requests are grouped every logic volume of the same performance as mentioned above, the disk time-sharing control by the input/output scheduling unit 32 provided for the disk input/output scheduling unit 20 is performed in accordance with the flowchart of FIGS. 6A and 6B. Thus, even if the logic volumes of different performance requirements mixedly exist in each of the same disk drives 24-1 and 24-2, the minimum value of the input/output performance for each logic volume can be guaranteed.

Figure 9A:
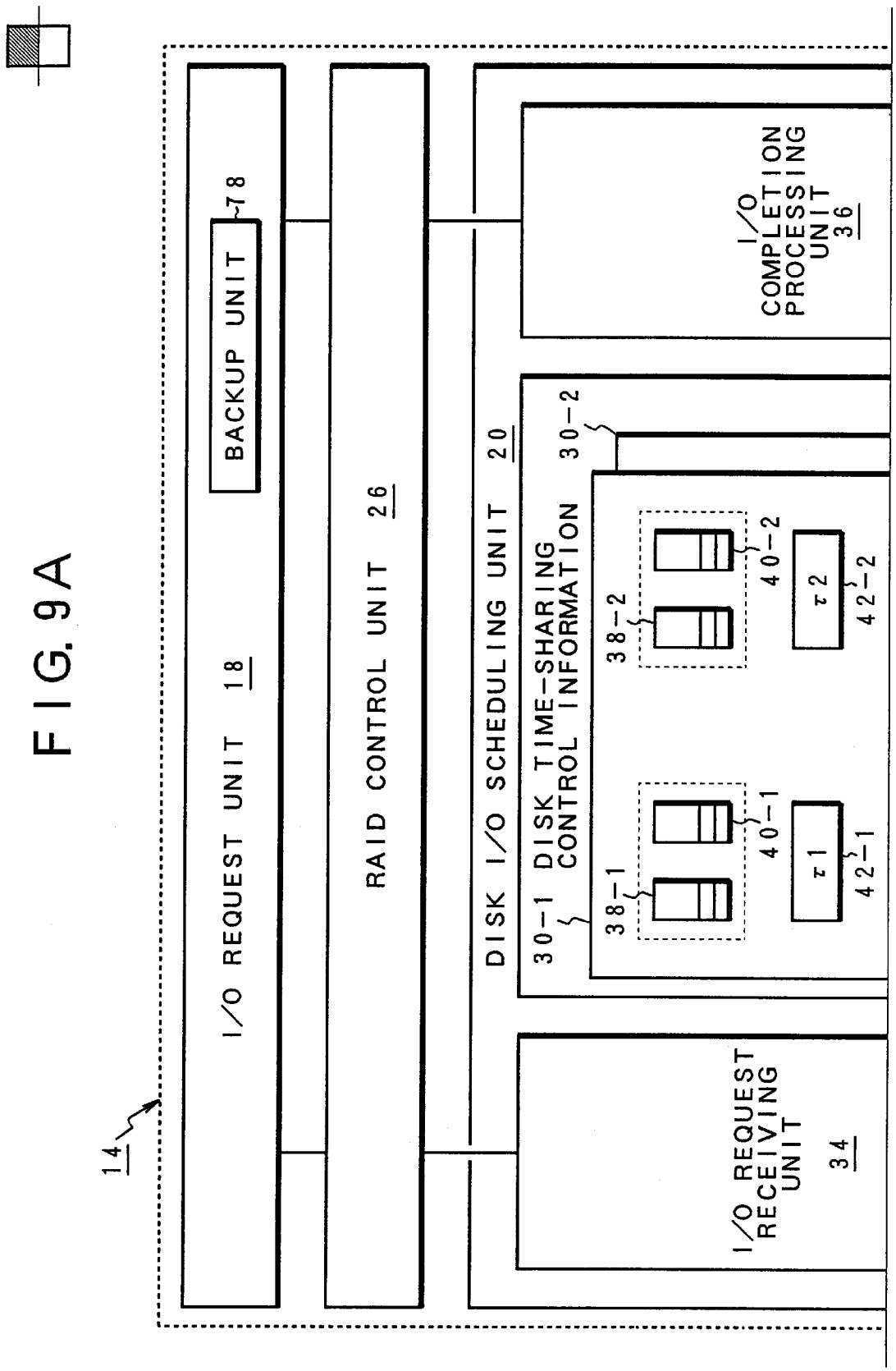
FIGS. 9A and 9B are functional block diagrams of an embodiment of the invention corresponding to input/output groups of copy/backup processes and ordinary processes.
Figure 9B:
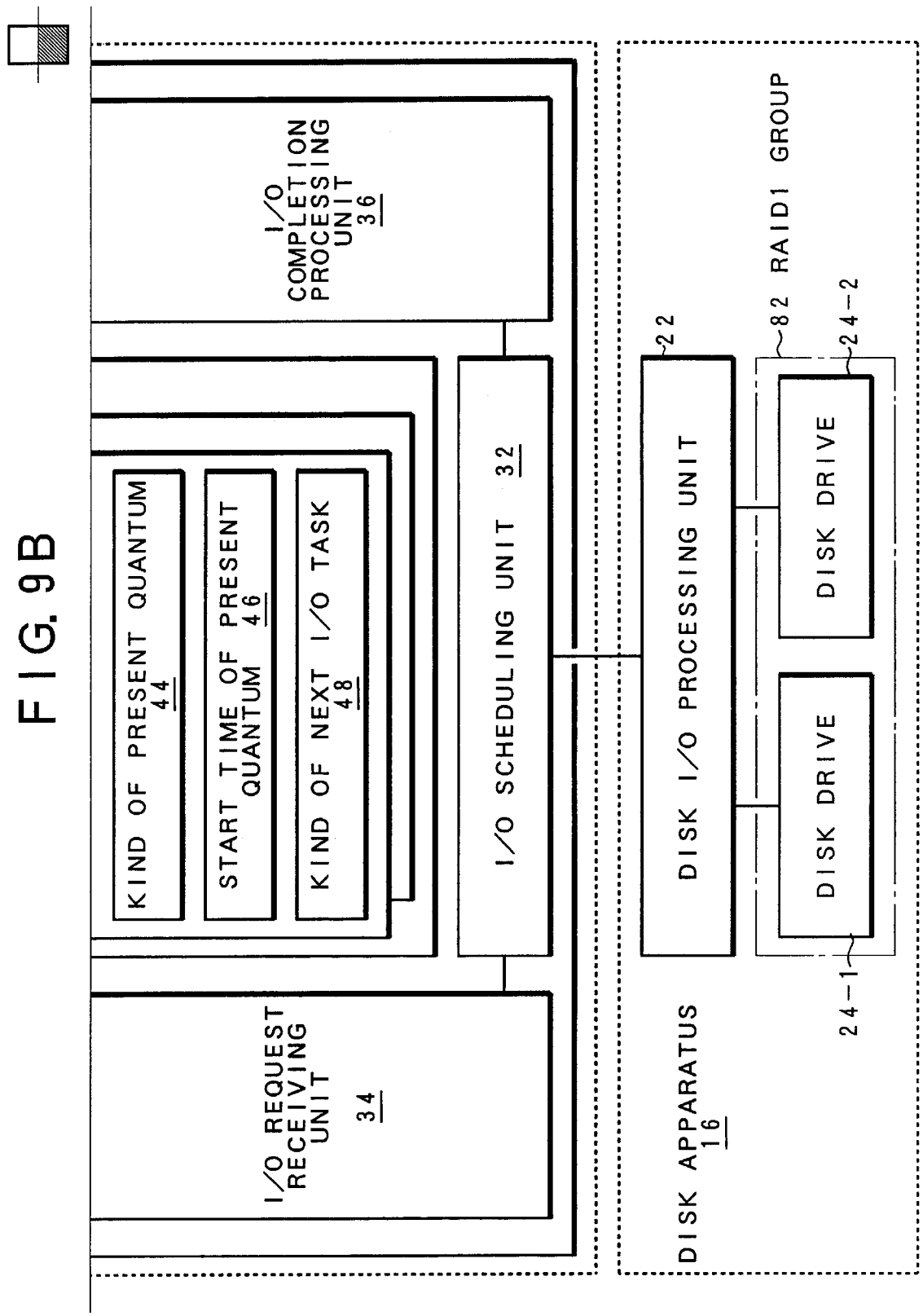

FIGS. 9A and 9B are block diagrams of an embodiment of the invention in the case where the disk time-sharing is performed by grouping the input/output requests into an input/output group for the backup process and an input/output group for the ordinary processes. In a manner similar to the embodiment of FIGS. 2A and 2B, a disk time-sharing apparatus of the invention applied to the array disk apparatus 14 and disk apparatus 16 comprises: the input/output request unit 18; RAID control unit 26; disk input/output scheduling unit 20; and disk input/output processing unit 22. Further, the disk drives 24-1 and 24-2 construct an RAID1 group 82. In this case, RAID1 has a mirror construction in which the data in the disk drive 24-1 has been copied to the disk drive 24-2 as a mirror disk. A backup unit 78 to request the reading operation for the backup process to the RAID control unit 26 is provided for the input/output request unit 18. It is now assumed that distribution ratios of disk resources for the ordinary processes and the backup process are defined as $$\alpha 1:\alpha 2=10:1$$

for the RAID1 group 82 provided for the disk apparatus 16. Since the RAID1 group 82 is constructed by the two disk drives 24-1 and 24-2, the disk time-sharing control information 30-1 and 30-2 corresponding to the disk drives 24-1 and 24-2 is set into the disk input/output scheduling unit 20. That is, the schedule waiting group queue 38-1 and completion waiting group queue 40-1 are provided in correspondence to the input/output group for the backup process. The schedule waiting group queue 38-2 and completion waiting group queue 40-2 are provided in correspondence to the input/output group for the ordinary processes. The quantum waiting time $\tau 1$ and $\tau 2$ calculated on the basis of the disk distribution ratios $\alpha 1:\alpha 2=10:1$ of the ordinary processes and the backup process is stored in the quanta for groups 42-1 and 42-2. For example, the quantum waiting time $\tau 1=200$ milliseconds is set with respect to the ordinary input/output group and the quantum waiting time $\tau 2=20$ milliseconds is set with respect to the backup input/output group. The input/output request from the input/output request unit 18 is to convert the logic input/output requested by the RAID control unit 26 into a physical input/output. At this time, an interface to notify the input/output requesting interface for the RAID control unit 26 of a fact that in case of the input/output from the backup unit 78, it is the backup input/output is added. When the disk input/output scheduling unit 20 is requested to input/output, the RAID control unit 26 notifies of a result of a discrimination about whether the input/output is the ordinary input/output or the backup input/output. Therefore, in the input/output request receiving unit 34 of the disk input/output scheduling unit 20, the input/output request from the RAID control unit 26 is received and whether the input/output is the backup input/output or the ordinary input/output can be recognized. If the ordinary input/output request is received, it is stored into the schedule waiting group queue 38-1 of the ordinary input/output group. In case of the backup input/output, it is stored into the schedule waiting group queue 38-2 of the backup input/output group. The input/output scheduling unit 32 classifies the inputs/outputs into the ordinary input/output group and the backup input/output group and performs the disk time-sharing by the disk time-sharing process according to the flowchart of FIGS. 6A and 6B. Now, assuming that each of the disk drives 24-1 and 24-2 of the RAID1 group 82 is constructed by, for example, four logic volumes, even in case of backing up one logic volume or in case of backing up four logic volumes simultaneously, the resource using time in the disk drives 24-1 and 24-2 is equal. That is, assuming that the quantum waiting time is set to $\tau 1=200$ milliseconds and $\tau 2=20$ milliseconds, the operation such that the time of 20 milliseconds is consumed in the backup process and the apparatus subsequently waits for 200 milliseconds is repeated. Therefore, an influence on the ordinary processes can be guaranteed irrespective of a multiplex degree of the backup.

In case of backing up one logic volume in the disk drive 24-1 into the disk drive 24-2, the backup process is obviously completed in time of a quarter of that in case of backing up the four logic volumes simultaneously.

FIGS. 10A and 10B are block diagrams of an embodiment of the invention in the case where the disk apparatus has an RAID construction and the inputs/outputs are classified into an input/output group for the rebuilding process and an input/output group for the ordinary processes. That is, the time-sharing of the disk apparatus is performed between the rebuilding process and the other processes by allowing the inputs/outputs in the disk apparatus with the RAID construction to correspond to one input/output group. In a manner similar to the embodiment of FIG. 1, a disk time-sharing apparatus of the invention provided for the array disk apparatus 14 and disk apparatus 16 comprises the input/output request unit 18, RAID control unit 26, disk input/output scheduling unit 20, and disk input/output processing unit 22. The RAID1 group 82 having a mirror construction is constructed by the disk drives 24-1 and 24-2. In the disk drives 24-1 and 24-2 constructing the RAID1 group 82, if any of the disk drives, for example, the disk drive 24-2 fails, it is necessary to perform a rebuilding process to copy the data in the disk drive 24-1 to the disk drive 24-2 after the disk drive 24-2 that failed is exchanged for a normal apparatus. For this purpose, a rebuilding unit 84 is provided for the input/output request unit 18. At the time of the rebuilding process, an interface indicative of the rebuilding process with respect to the input/output request to the RAID control unit 26 is added. When the disk input/output scheduling unit 20 is requested to input/output, the RAID control unit 26 notifies it of a rebuilding input/output. The disk time-sharing control information 30-1 and 30-2 is provided for the disk input/output scheduling unit 20 in correspondence to the two disk drives 24-1 and 24-2 of the RAID1 group 82. For example, now considering the disk time-sharing control information 30-1 corresponding to the disk drive 24-1, the schedule waiting group queue 38-1 and completion waiting group queue 40-1 are provided in correspondence to the ordinary input/output group, and the schedule waiting group queue 38-2 and completion waiting group queue 40-2 are provided in correspondence to the input/output group for the rebuilding process. Further, the quantum waiting time τ1 and τ2 based on the distribution ratios α1 and α2 of the disk resources at the time of the ordinary processes and the rebuilding process is set. Further, the present quantum kind information 44, present quantum start time 46, and further, next input/output task kind information 48 are provided for each of the input/output group for the ordinary processes and the input/output group for the rebuilding process. As mentioned above, even in case of dividing the inputs/outputs into the input/output group for the ordinary processes and the input/output group for the rebuilding process, the disk time-sharing control process by the input/output scheduling unit 32 is performed in accordance with the flowchart of FIGS. 6A and 6B. Therefore, in the embodiment of FIGS. 10A and 10B, in the rebuilding process of the disk apparatus with the RAID construction, while an influence on the input/output performance of the ordinary processes is suppressed and the time that is required until the completion of the rebuilding is guaranteed, the time that is required until the completion of the rebuilding can be reduced as much as possible.

Figure 11:
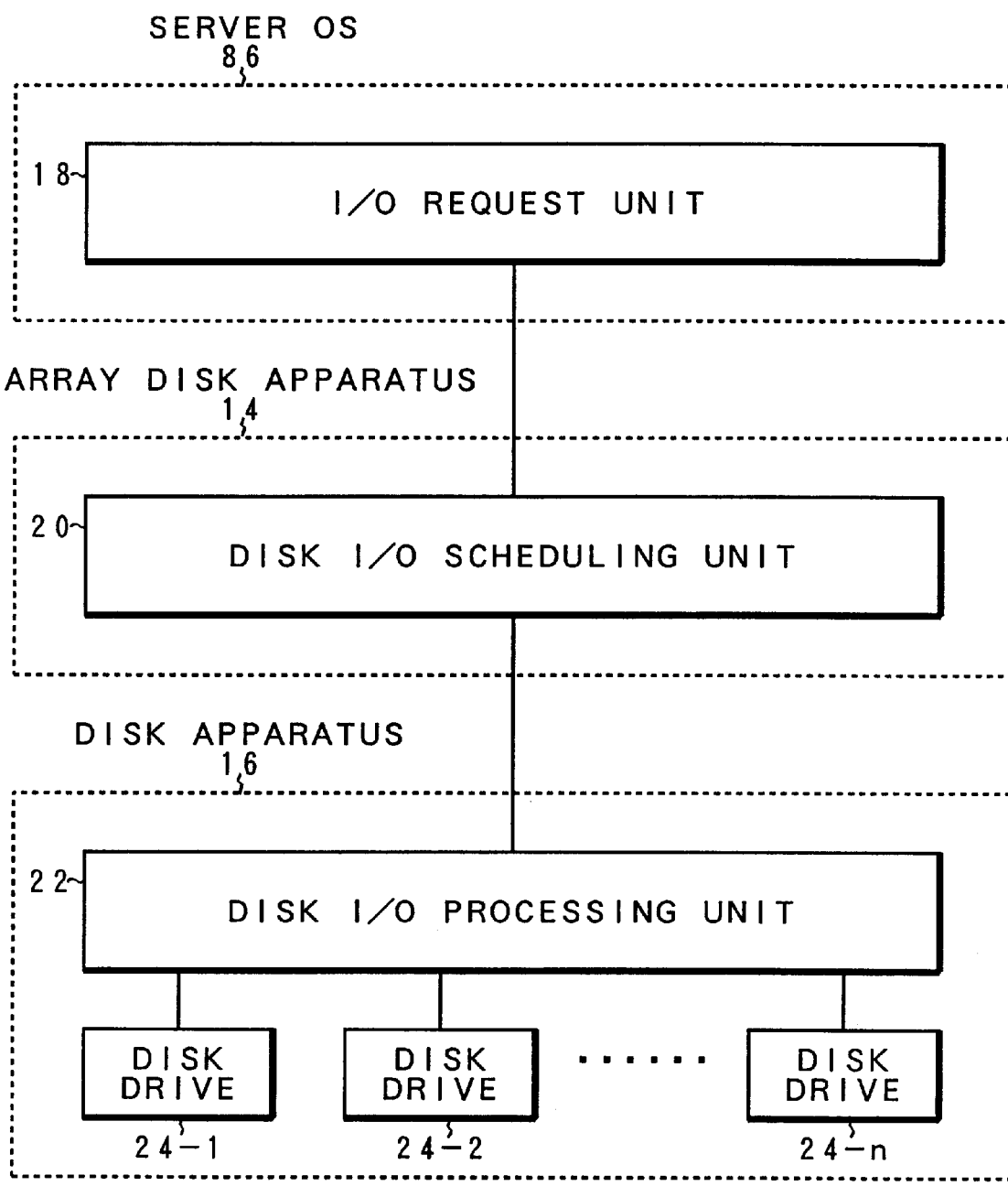
FIG. 11 is a constructional diagram of another system to which the invention is applied and in which an input/output request unit is provided for a server OS.

FIG. 11 is a block diagram showing another environment of a storage system to which the disk time-sharing apparatus of the invention is applied. In the storage system, the array disk apparatus 14 and disk apparatus 16 are provided as a storage system for a server OS 86. In this case, a disk time-sharing apparatus of the invention comprises: the input/output request unit 18 provided for the server OS 86; disk input/output scheduling unit 20 provided for the array disk apparatus 14; and further, disk input/output processing unit 22 and disk drives 24-1 to 24-n provided for the disk apparatus 16. The disk time-sharing apparatus of the invention comprising the input/output request unit 18, disk input/output scheduling unit 20, disk input/output processing unit 22, and disk drives 24-1 to 24-n has the fundamental construction shown in FIG. 1, and specifically speaking, performs the disk time-sharing such that the inputs/outputs are divided into input/output groups as shown in FIGS. 7A to 10B and the resources of the disk apparatus are used.

Figure 12:
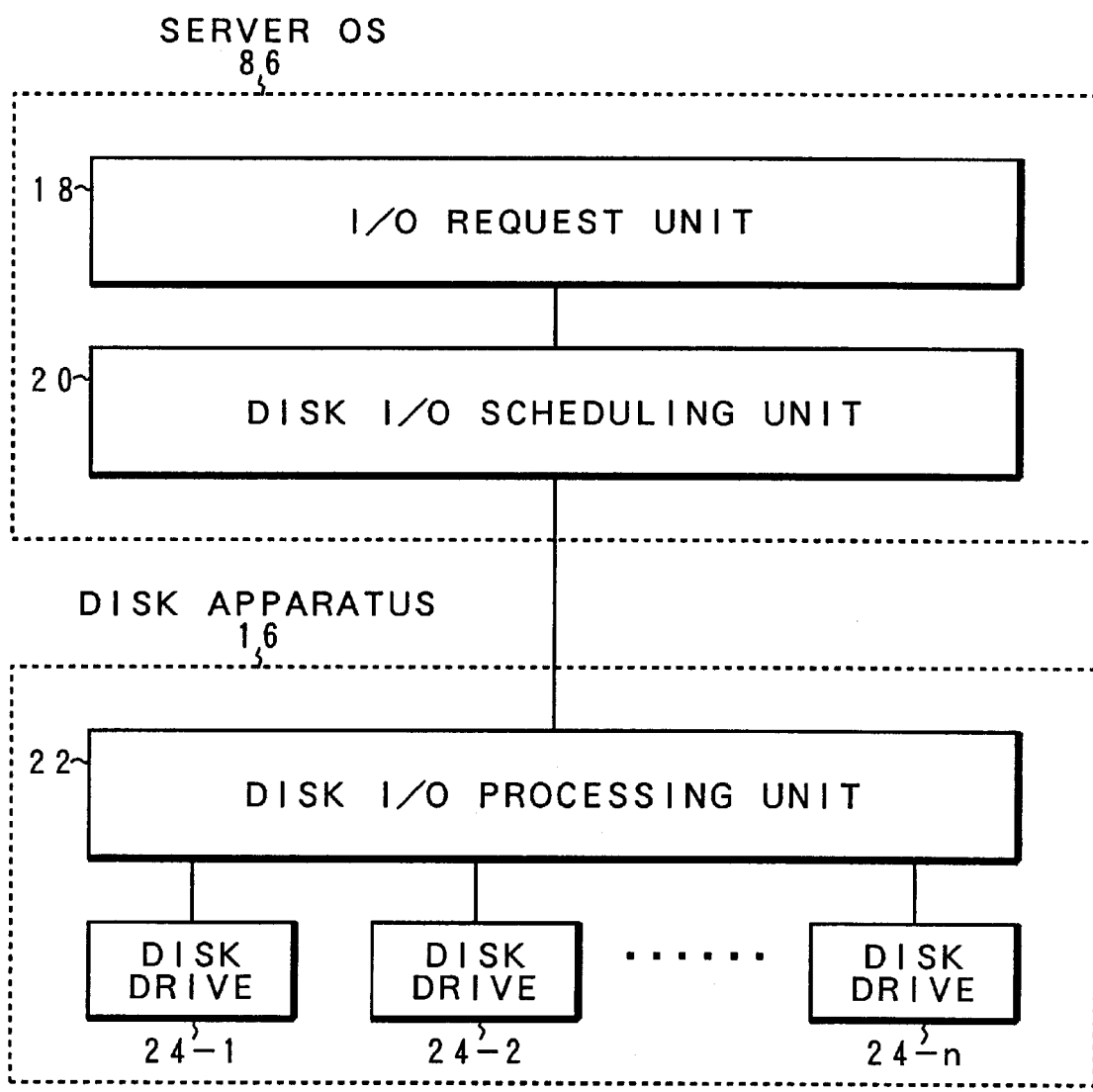
FIG. 12 is a constructional diagram of another system to which the invention is applied and in which the input/output request unit and a disk input/output scheduling unit are provided for the server OS.

FIG. 12 shows another example of a storage system to which the disk time-sharing apparatus of the invention is applied. The disk apparatus 16 is connected to the server OS 86. In this case, the input/output request unit 18 and disk input/output scheduling unit 20 are provided for the server OS 86. The disk input/output processing unit 22 and disk drives 24-1 to 24-n are provided for the disk apparatus 16. Obviously, the operating environment of the storage system to which the disk time-sharing apparatus of the invention is applied is not limited to FIGS. 11 and 12 but includes a proper upper apparatus, an intermediate control apparatus, and further, a hardware construction of a physical device.

Figure 13:
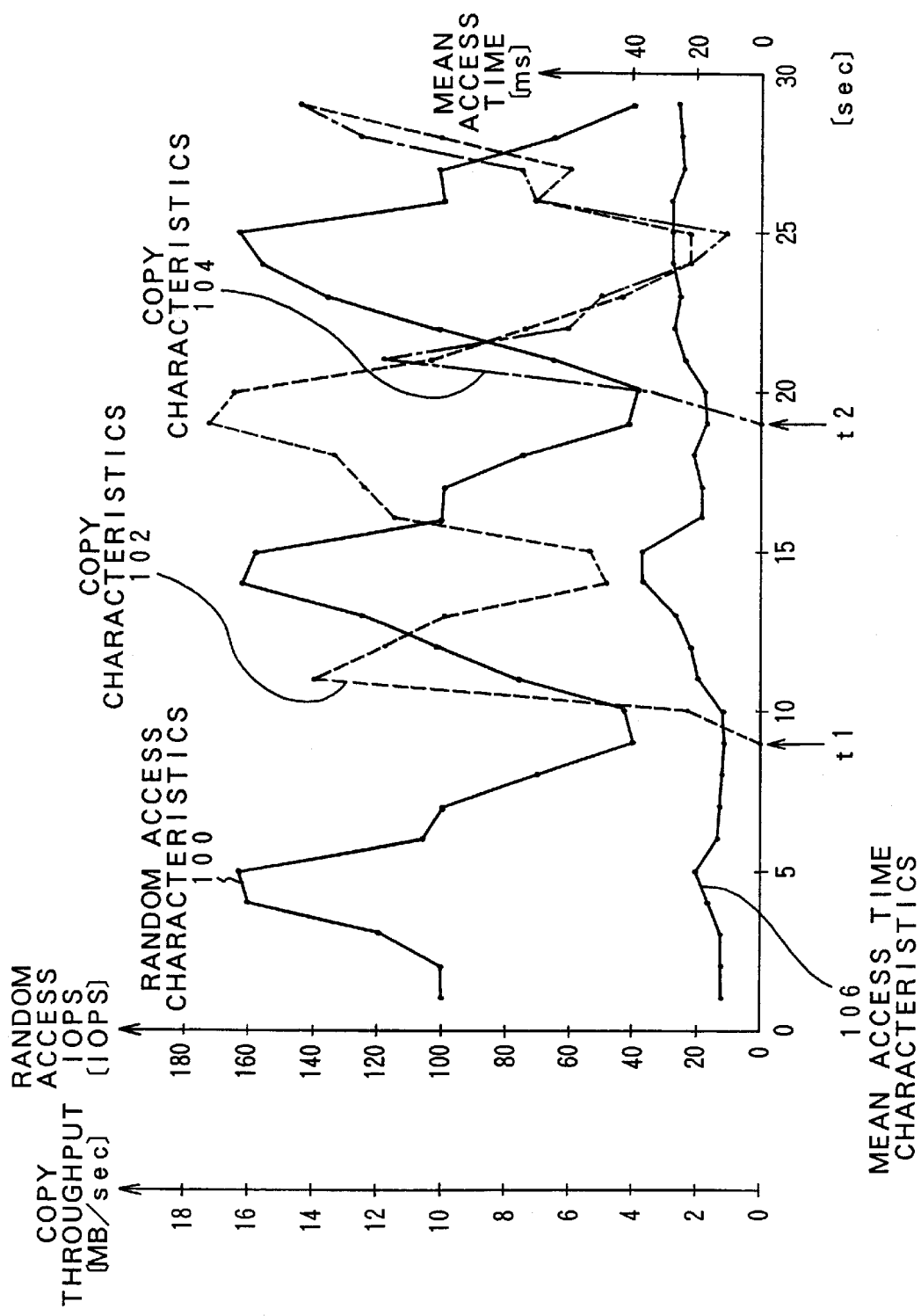
FIG. 13 is a characteristics diagram of measurement results in the case where a copying process for backup as a sequential access is executed simultaneously with an OLTP work of a random access to a database in the embodiment of FIGS. 8A and 8B.

FIG. 13 shows measurement results in the case where the copying process for backup as a sequential access is executed simultaneously with the OLTP work of the random access for the database in accordance with the embodiment of FIGS. 9A and 9B. First, a period Tc for which the disk time-sharing is performed is set to Tc=200 μsec. The input/output groups are classified into the three groups G1, G2, and G3. Allocation ratios of the disk resources are set to $$\alpha 1:\alpha 2:\alpha 3=90:5:5$$

The inputs/outputs of the random access are allocated to the input/output group G1, a copying process 1 is allocated to the input/output group G2, and a copying process 2 is allocated to the input/output group G3. Characteristics 100 denote an IOPS throughput of the random access. To give an aging change, in the random access, the throughput is changed to 100 IOPS, 160 IOPS, 40 IOPS, and 100 IOPS and this process is repeated about every 10 seconds. For such random access characteristics 100, the copying process 1 is activated at subsequent time t1, and the copying process 2 is activated at time t2. The performance characteristics of those two copying processes are shown in copying characteristics 102 and 104 as copy amounts per second [MB/sec]. When each of the copying processes 1 and 2 is solely executed (without competition with the other), a throughput of 20 MB/sec is shown. In the measurement, the copying process throughput and the random access response time become key points. Further, characteristics 106 show a mean access time [milliseconds] of the random access when the disk time-sharing of the invention is performed. As will be obvious from the measurement results, when a copying process OPC1 is started at time t1, since an IOPS throughput of the random access characteristics 100 is small in this instance, a data throughput of the copying characteristics 102 largely increases (14 MB/sec). Subsequently, when the random access characteristics 100 increase, the throughput of the copying characteristics 102 decreases (5 MB/sec) in association with it. Further, a copying process OPC2 is started at time t2 and a multiplex copying process in which the two copying processes 1 and 2 are performed simultaneously is executed. Even in such a state where the input/output requests for the random access and the two copying processes compete as mentioned above, when the first copying process OPC1 is started at time t1, the mean access time characteristics 106 of the random access slightly rise higher than the access time so far. However, the maximum access time is suppressed to time within 40 milliseconds. Even when the second copying process 2 is started at time t2, a steep extension of the access time of the random access does not occur. The performance guarantee by the disk time-sharing according to the invention can be confirmed.

According to the invention as mentioned above, in the case where in response to various input/output requests for the same disk apparatus, the inputs/outputs are classified into the groups on the basis of the nature of the input/output request and if the inputs/outputs of a plurality of input/output groups compete, by performing the disk time-sharing such that the quantum (allocating time) which has previously been defined every group is sequentially switched and the disk apparatus is used, the minimum value of the input/output performance can be guaranteed every input/output group. More specifically speaking, when the random access and the sequential access mixedly exist for the same disk apparatus, by classifying the inputs/outputs into the input/output group of the random access and the input/output group of the sequential access and performing the disk time-sharing, the minimum value of each of the input/output performance of the random access and the input/output performance of the sequential access can be guaranteed.

In the case where the logic volumes of different performance requirements mixedly exist in the same disk apparatus, by grouping the logic volumes by the same performance requirement and performing the disk time-sharing, the minimum value of the input/output performance can be guaranteed every logic volume. In the case where many and unspecified backup processes and copying processes operate for the same disk apparatus, by classifying the inputs/outputs into the input/output group of the backup process and copying process and the input/output group of the other ordinary processes and performing the disk time-sharing, the input/output performance can be guaranteed with respect to the ordinary inputs/outputs other than the backup process and copying process irrespective of the multiplex degree of the backup process and copying process.

Further, in the rebuilding process for copying data from a normal disk when the disk fails in the disk apparatus with the RAID construction, by classifying the inputs/outputs into the input/output group of the rebuilding process and the input/output group of the other ordinary processes and performing the disk time-sharing, an adverse influence on the performance of the ordinary input/output process by the rebuilding process is suppressed and, at the same time, while the time that is required until the completion of the rebuilding is guaranteed, the time that is required until the completion of the rebuilding can be reduced as much as possible.

Further, in the disk time-sharing in which the inputs/outputs are grouped, in the case where the disk apparatus has the re-ordering function to execute in order from the input/output in which the positioning time is the minimum among the received input/output requests, upon switching of the time-sharing of the input/output group, namely, upon switching of the quantum, with respect to the first input/output request, the input/output is requested by the ordered task in which after completing all of the inputs/outputs which are not completed enough at the previous quantum before the switching, the first input/output after the quantum switching is performed. With respect to the other input/output requests, by designating the simple task for selecting the input/output which minimizes the positioning time, the ordering function which the disk apparatus has is made the most of. Further, the delay such that the input/output is kept waiting for time than it is needed due to the ordering function is restricted by the quantum switching, thereby enabling the extension of the maximum response time to be prevented.

As for the grouping of the inputs/outputs, the above embodiments have been described with respect to the examples such that the inputs/outputs are classified into the input/output group of the random access and the input/output group of the sequential access, they are grouped every logic volume of the same performance requirement, they are grouped according to the backup process and the copying process, and they are grouped by the rebuilding process of RAID. However, different inputs/outputs which need to guarantee the minimum value of the input/output performance other than those inputs/outputs can be also obviously grouped.

Although the above embodiments have been described with respect to the example of the case of selectively using the simple task and the ordered task as an input/output request when the ordering function of the disk drive is used, the invention is not limited to it but the input/output request can be also verified with regard to a disk drive which does not have the re-ordering function.

In this case, the next input/output task kind information 48 provided for the disk time-sharing control information of each embodiment is removed and there is no need to change the setting of the task in steps S8, S9, and S10 in the flowchart for the time-sharing control process in FIGS. 7A and 7B.

Further, the invention is not limited by the numerical values shown in the embodiments but incorporates many proper modifications within the scope of Claims without losing the objects and advantages of the present invention.

What is claimed is:

1. A disk time-sharing apparatus comprising:
   a disk apparatus having one or a plurality of disk drives;
   an input/output request unit for issuing an input/output request to said disk apparatus; and
   an input/output scheduling unit for forming input/output groups obtained by grouping input/output sources to/from said disk apparatus, defining a ratio of time during which each of said input/output groups uses the disk apparatus, deciding an allocating time (quantum) during which each input/output group can use the disk apparatus continuously on the basis of said defined time ratio, and performing a time-sharing such that, in the case where input/output requests are received to the disk apparatus from a plurality of input/output groups, said allocating time is sequentially switched among the competing input/output groups and the disk apparatus is used.

2. An apparatus according to claim 1, wherein when there is the input/output request from only one input/output group, said input/output scheduling unit enables the disk apparatus to be used continuously for the inputs/outputs from one input/output group.

3. An apparatus according to claim 1, wherein said input/output scheduling unit allows the inputs/outputs whose accessing mode is determined to be a sequential access to correspond to a sequential access input/output group, allows the other inputs/outputs to correspond to a random access input/output group, and performs the time-sharing of the disk apparatus in the sequential access and the random access.

4. An apparatus according to claim 1, wherein said input/output scheduling unit allows a plurality of logic volumes whose performance requirements are the same to correspond to one input/output group, and performs the time-sharing of the disk apparatus among logic volumes of different performance requirements.

5. An apparatus according to claim 1, wherein said input/output scheduling unit allows inputs/outputs of copying and backup processes to correspond to one input/output group, and performs the time-sharing of the disk apparatus between the copying and backup processes and the other processes.

6. An apparatus according to claim 1, wherein
said disk apparatus has a plurality of disk drives and has an RAID construction such that even if one of said disk drives fails, data can be restored and rebuilt from the other disk drive, and
said input/output scheduling unit allows the inputs/outputs of a rebuilding process of said disk apparatus with the RAID construction to correspond to one input/output group, and performs the time-sharing of said disk apparatus between the rebuilding process and the other processes.

7. An apparatus according to claim 1, wherein
said disk apparatus has an ordered task function for scheduling a plurality of inputs/outputs so as to minimize positioning time by a designation of a first task and scheduling inputs/outputs of a second task designation after completing input/output which is being received by the designation of the second task, and
when the time-sharing of said disk apparatus is performed, said input/output scheduling unit schedules separately as for the designation of said first task and the designation of said second task.

8. An apparatus according to claim 7, wherein when the time-sharing to use the disk apparatus sequentially among said plurality of input/output groups is performed, said input/output scheduling unit performs the scheduling in a manner such that as for the first input/output just after the input/output group is switched, the second task is designated and the inputs/outputs of the group before switching are completed and, thereafter, the inputs/outputs of the group after the switching are scheduled, and the inputs/outputs until the group is subsequently switched after that are designated by the first task and said plurality of inputs/outputs are scheduled so as to minimize the positioning time.

9. An apparatus according to claim 8, wherein said input/output scheduling unit predicts next quantum start time on the basis of prediction processing time of unprocessed inputs/outputs at the time of a quantum switching, predicts remaining time every reception of an input/output request or a completion response of the input/output request on the basis of the prediction processing time of the unprocessed inputs/outputs at that time and said quantum start time, supplies an input/output request of a present quantum to said disk apparatus when the presence of the remaining time is determined, and switches the present quantum to the next quantum when the absence of the remaining time is decided.

10. An apparatus according to claim 7, wherein when the disk apparatus is used continuously for the inputs/outputs from one input/output group, said input/output scheduling unit performs the scheduling in a manner such that as for the first input/output just after the allocating time is reset, the second task is designated and the inputs/outputs before resetting are completed and, thereafter, the inputs/outputs after the resetting are scheduled, and the inputs/outputs until the resetting is performed subsequently are designated by the first task and said plurality of inputs/outputs are scheduled so as to minimize the positioning time.

11. A disk time-sharing method for a disk time-sharing apparatus comprising a disk apparatus having one or a plurality of disk drives, an input/output request unit for issuing an input/output request to said disk apparatus, and an input/output scheduling unit for scheduling the use of said disk apparatus on the basis of said input/output request, wherein said method comprises the steps of:
forming input/output groups obtained by grouping input/output sources to/from said disk apparatus and defining a ratio of time during which each input/output group uses the disk apparatus;
deciding allocating time (quantum) during which each input/output group can use the disk apparatus continuously on the basis of said defined time ratio; and
when input/output requests are received from the plurality of input/output groups to the disk apparatus, performing a time-sharing such that the disk apparatus is used by sequentially switching said allocating time among the competing input/output groups.

12. A method according to claim 11, wherein when there is the input/output request from only one input/output group, said disk apparatus is enabled to be used continuously for the inputs/outputs from one input/output group.

13. A method according to claim 11, wherein the inputs/outputs whose accessing mode is determined to be a sequential access are allowed to correspond to a sequential access input/output group, the other inputs/outputs are allowed to correspond to a random access input/output group, and the time-sharing of the disk apparatus is performed in the sequential access and the random access.

14. A method according to claim 11, wherein a plurality of logic volumes whose performance requirements are the same are allowed to correspond to one input/output group, and the time-sharing of the disk apparatus is performed among logic volumes of different performance requirements.

15. A method according to claim 11, wherein inputs/outputs of copying and backup processes are allowed to correspond to one input/output group, and the time-sharing of the disk apparatus is performed between the copying and backup processes and the other processes.

16. A method according to claim 11, wherein
said disk apparatus has a plurality of disk drives and has an RAID construction such that even if one of said disk drives fails, data can be restored and rebuilt from the other disk drive, and
the inputs/outputs of a rebuilding process of said disk apparatus with the RAID construction are allowed to correspond to one input/output group, and the time-sharing of said disk apparatus is performed between the rebuilding process and the other processes.

17. A method according to claim 11, wherein
said disk apparatus has an ordered task function for scheduling a plurality of inputs/outputs so as to minimize positioning time by a designation of a first task and scheduling inputs/outputs of a second task designation after completing input/output which is being received by the designation of the second task, and
when the time-sharing of said disk apparatus is performed, the scheduling is performed separately as for the designation of said first task and the designation of said second task.

18. A method according to claim 17, wherein when the time-sharing to use the disk apparatus sequentially among said plurality of input/output groups is performed, as for the first input/output just after the input/output group is switched, the second task is designated and the inputs/outputs of the group before switching are completed and, thereafter, the inputs/outputs of the group after the switching are scheduled, the inputs/outputs until the group is subsequently switched are designated by the first task, and said plurality of inputs/outputs are scheduled so as to minimize the positioning time.

19. A method according to claim 18, wherein next quantum start time is predicted on the basis of prediction processing time of unprocessed inputs/outputs at the time of a quantum switching, remaining time is predicted every reception of an input/output request or a completion response of the input/output request on the basis of the prediction processing time of the unprocessed inputs/outputs at that time and said quantum start time, an input/output request of a present quantum is supplied to said disk apparatus when the presence of the remaining time is determined, and the present quantum is switched to the next quantum when the absence of the remaining time is decided.

20. A method according to claim 17, wherein when the disk apparatus is used continuously for the inputs/outputs from one input/output group, as for the first input/output just after the allocating time is reset, the second task is designated and the inputs/outputs before resetting are completed and, thereafter, the inputs/outputs after the resetting are scheduled, the inputs/outputs until the resetting is performed subsequently are designated by the first task, and said plurality of inputs/outputs are scheduled so as to minimize the positioning time.

* * * * *